(12) United States Patent
Yoshii et al.

(10) Patent No.: US 11,074,034 B2
(45) Date of Patent: Jul. 27, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Kengo Yoshii, Tokyo (JP); Makoto Murata, Kanagawa (JP); Naoki Shibuya, Chiba (JP); Masafumi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 23 days.

(21) Appl. No.: 16/085,419

(22) PCT Filed: Jan. 24, 2017

(86) PCT No.: PCT/JP2017/002309
§ 371 (c)(1),
(2) Date: Sep. 14, 2018

(87) PCT Pub. No.: WO2017/187678
PCT Pub. Date: Nov. 2, 2017

(65) Prior Publication Data
US 2019/0073183 A1    Mar. 7, 2019

(30) Foreign Application Priority Data
Apr. 27, 2016    (JP) .............................. JP2016-089227

(51) Int. Cl.
*G06F 3/16*    (2006.01)
*G06F 3/01*    (2006.01)
(Continued)

(52) U.S. Cl.
CPC ................ *G06F 3/165* (2013.01); *G06F 3/01* (2013.01); *G06F 3/011* (2013.01); *G06F 3/0483* (2013.01);
(Continued)

(58) Field of Classification Search
CPC . G06F 3/165; G06F 3/01; G06F 3/011; G06F 3/0484; G06F 3/0483; G06F 3/167; G10L 13/00; G10L 13/043
See application file for complete search history.

(56) References Cited

U.S. PATENT DOCUMENTS 9,794,511 B1 *  10/2017  McQueen .............. H04N 7/142
2011/0137836 A1 *  6/2011  Kuriyama ............. A61B 5/1118
                                                    706/12

(Continued)

FOREIGN PATENT DOCUMENTS

JP    2001-005634 A    1/2001
JP    2006-023860 A    1/2006
(Continued)

*Primary Examiner* — Jennifer N To
*Assistant Examiner* — Ashley M Fortino
(74) *Attorney, Agent, or Firm* — Paratus Law Group, PLLC

(57) ABSTRACT

There is provided an information processing apparatus, an information processing method, and a program that can improve the convenience when checking audio information that is read aloud. The information processing apparatus includes an output control section that outputs information about a display screen for displaying text of audio information in chronological order with information granularity determined on the basis of a user operation at the time of reading aloud the audio information included in an acquired reading-aloud history of the audio information.

10 Claims, 22 Drawing Sheets

(51) Int. Cl.
*G06F 3/0484* (2013.01)
*G06F 3/0483* (2013.01)
*G10L 13/00* (2006.01)

(52) U.S. Cl.
CPC ............ *G06F 3/0484* (2013.01); *G06F 3/167* (2013.01); *G10L 13/00* (2013.01)

(56) References Cited

U.S. PATENT DOCUMENTS

2012/0310649 A1* 12/2012 Cannistraro ............ G10L 13/00
704/260
2015/0120648 A1* 4/2015 Slovacek ................ G06F 16/41
707/609
2017/0270965 A1* 9/2017 Bao ......................... G06F 16/35

FOREIGN PATENT DOCUMENTS

| JP | 2010-026813 A | 2/2010 |
| JP | 2013-005021 A | 1/2013 |
| JP | 2014-519058 A | 8/2014 |
| JP | 2015-169768 A | 9/2015 |

* cited by examiner

FIG. 4

| DATE AND TIME | POSITION | POSITION NAME | ACTION (HIGH CONTEXT) | ACTION (LOW CONTEXT) | OPERATION | READING-ALOUD INFORMATION | READ-ALOUD INFORMATION |
|---|---|---|---|---|---|---|---|
| 2016-03-15T19:45:22-08:00 | 37.773962,-122.43297 | Presidio Park | Outside | Run | Bookmark | http://www.XXXX.123456 | Presidio Officers' Club·········· |
| 2016-03-15T19:10:55-08:00 | 37.773959,-122.42241 | On BART | On the way home | Vihecle | | http://www.XXXX.234567 | 13 Top Scientist's Favorite Books And Club············ |
| 2016-03-15T19:10:35-08:00 | 37.773928,-122.42211 | On BART | On the way home | Vihecle | Skip | http://www.XXXX.678910 | 5 Healthy and Satisfying Lunch Salads in········ |
| 2016-03-15T19:09:12-08:00 | 37.773910,-122.42298 | On BART | On the way home | Vihecle | More | http://www.XXXX.456789 | YY SITE's top conspiracy········ I like to········ |
| ... | ... | ... | ... | ... | ... | ... | ... |

FIG. 17

Today's Timeline

7:45 pm : Events — at Presidio Park — 461

Presidio Officers' Club reopening party provided by AA NEWS

The first troops to deploy ............................................
................................................................
................................................................
.......................................
................................................................
............

462 — 7:10 pm : News — at NorthPoint St

13 Top Scientist's Favorite Books And Movies provided by Huffington post

There's a big difference ...... ........ ....... ...........

463 — 7:12 pm : News — on BART

5 Healthy and Satisfying Lunch Salads in ....

provided by XXX

464 — 7:07 pm : Message — on BART

"I just realized we got through Christmas this yesr without
............ ........ !"

hanako(@hanako-massage13)

FIG. 18

Today's Timeline

| 7:45 pm : Events | at Presidio Park | —471

Presidio Officers' Club reopening party provided by AA NEWS ⭐ ←472

The first troops to deploy ························
··································
··································
··································
··································
············.

---

13 Top Scientist's Favorite Books And Movies
provided by Huffington post
There's a big difference ····· ········ ········ ············.

5 Healthy and Satisfying Lunch Salads in ····
provided by XXX        ⏩ ←473

| 7:10 pm : News | on BART | —474

YY SITE 's top conspiracy ···
provided by Daily Dot
←475

I like to think at the dawn ·······························
··································
··································
··································
··································
···············.

FIG. 19

| Today's Timeline | | |
|---|---|---|
| 7:10 pm : News | 🚲 at The Embarcadero | ← 481 |

- 13 Top Scientist's Favorite Books And Movies     provided by [N]

There's a big difference between ·······························
································································
········ ·········. (paused) ←— 482

| 7:15 pm : News | 🚲 at Bay St. | ← 483 |

(continue) ←— 484
The best of the science ·········································
································································
·······················.

YY SITE's top conspiracy theorist thinks ·····
                            provided by AA NEWS I like to think at the dawn of ···································
································································
································································
·············· ··········. (paused) ←— 485

| 7:45 pm : News | 🚶 at Presidio Park | ← 486 |

(continue)
487 ⤴ YY SITE and the ·············································
································································
·························.

FIG. 21
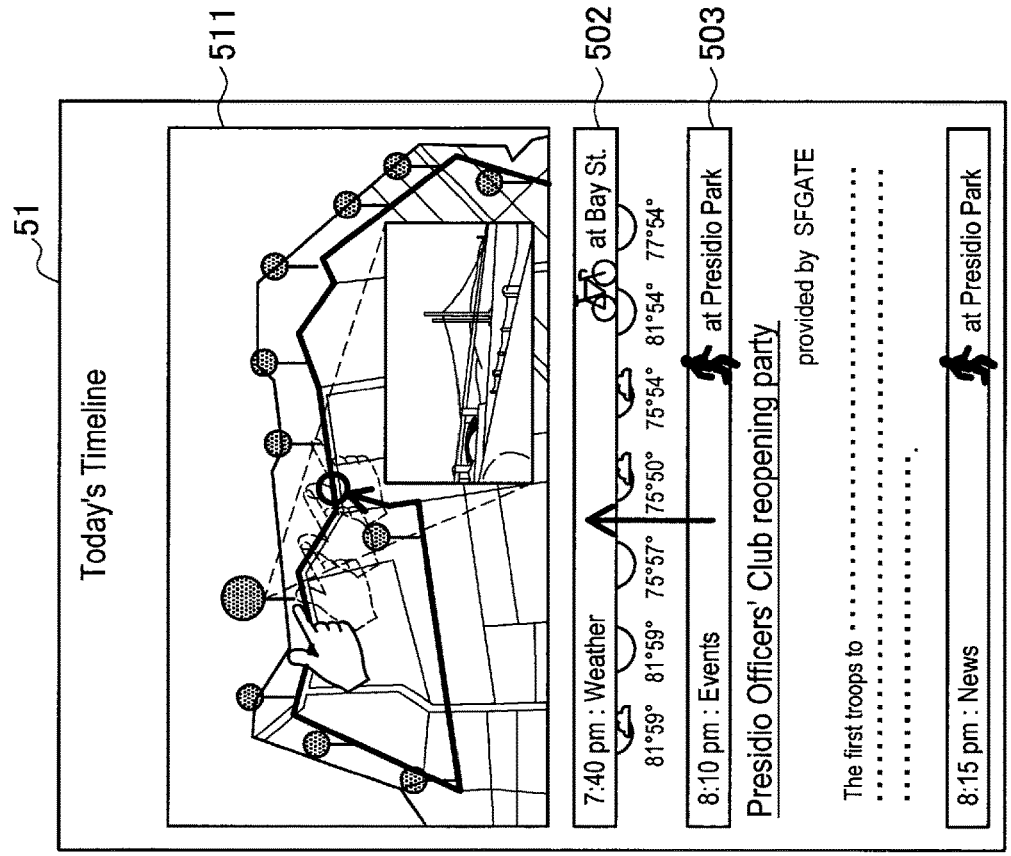
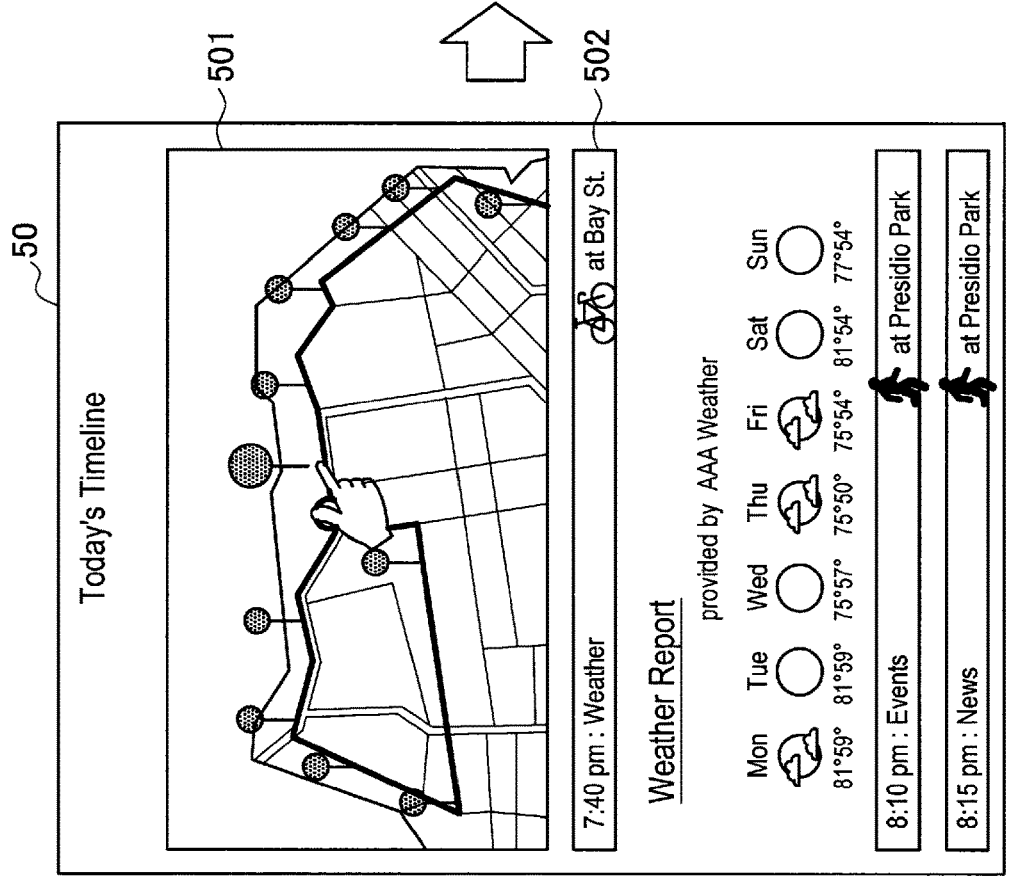

FIG. 22

```
                                                        ┌─ 52
┌─────────────────────────────────────────────────────┐
│                    Today's Timeline                 │
│  ┌───────────────────────────────────────────────┐  │
│  │ 7:10 pm : News              🚲  at The ···· St.│──┼── 521
│  └───────────────────────────────────────────────┘  │
│                                                     │
│  13 Top Scientist's  Favorite Books And Movies     │
│                                    provided by NN Post│
│                                                     │
│  There's a big difference ············ sci-fibooks and│
│  movies have ·····································. │
│                                                     │
│  The best of the ···································│
│  ················ Dr. XXX ·····.                    │
│  ···················································│
│  ···················.                               │
│                                                     │
│  ┌───────────────────────────────────────────────┐  │
│  │ 7:45 pm : Events            🏃  at Presidio Park│──┼── 522
│  └───────────────────────────────────────────────┘  │
│  Presidio Officers' Club  reopening party          │
│                                    provided by AA NEWS│
│                                                     │
│  The first troops ······ El Presidio de San Francisco│
│  were ··············································│
│  in the Santa Cruz Mountains, in 1794.             │
│  The ···············································│
│  ······.                                            │
└─────────────────────────────────────────────────────┘
```

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/002309 (filed on Jan. 24, 2017) under 35 U.S.C. § 371, which claims priority to Japanese Patent Application No. 2016-089227 (filed on Apr. 27, 2016), which are all hereby incorporated by reference in their entirety.

TECHNICAL FIELD

The present disclosure relates to an information processing apparatus, an information processing method, and a program.

BACKGROUND ART

As information processing and information communication technology has been developed in recent years, computers have been gaining widespread use and computers have been actively used even in daily life. For example, the use of a mobile communication terminal such as a smartphone or a mobile phone terminal makes it possible to view information by accessing to a network, enjoy a service of navigation to a destination when going out, or the like.

Information acquired by a user from an information processing terminal connected to a network is roughly divided into visual information and sound information. In particular, the visual information has high image quality and high resolution, and it is possible to present the information with intuitive, easy view with advance of graphic expression and development of a video display technology. However, in the case of the visual information, a field-of-view of the user is narrow and there is danger in viewing a display screen during movement. On the other hand, in a case of the sound information, it is possible to receive the presentation of information even during the movement without narrowing the field-of-view of the user.

Regarding the above-mentioned information presenting method with sound, according to, e.g., the following Patent Literature 1, an information processing apparatus is described that sound information is filtered, oriented, and output on the basis of a predetermined condition and information necessary for the user is intuitively understood as the sound information.

CITATION LIST

Patent Literature

Patent Literature 1: JP 2013-5021A

DISCLOSURE OF INVENTION

Technical Problem

Herein, with information presentation using audio, it is possible to understand information presented without losing the visual sense even while "doing something else" in daily life (while walking, riding a bicycle, doing housework, etc.). However, it is difficult to refer to missing information later or check detailed information in a case of the audio information.

Accordingly, according to the present disclosure, there is proposed an information processing apparatus, an information processing method, and a program that can improve the convenience when checking audio information that is read aloud.

Solution to Problem

According to the present disclosure, there is proposed an information processing apparatus including an output control section that outputs information about a display screen for displaying text of audio information in chronological order with information granularity determined on the basis of a user operation at the time of reading aloud the audio information included in an acquired reading-aloud history of the audio information.

According to the present disclosure, there is proposed an information processing method including outputting, by a processor, information about a display screen for displaying text of audio information in chronological order with information granularity determined on the basis of a user operation at the time of reading aloud the audio information included in an acquired reading-aloud history of the audio information.

According to the present disclosure, there is proposed a program causing a computer to function as an output control section that outputs information about a display screen for displaying text of audio information in chronological order with information granularity determined on the basis of a user operation at the time of reading aloud the audio information included in an acquired reading-aloud history of the audio information.

Advantageous Effects of Invention

As mentioned above, according to the present disclosure, it is possible to improve the convenience when checking the read-aloud audio information.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram illustrating an example of reading-aloud history data according to the present embodiment.

FIG. 17 is a diagram illustrating a screen display example according to a third example of the present embodiment.

FIG. 18 is a diagram illustrating a screen display example according to a fourth example of the present embodiment.

FIG. 19 is a diagram illustrating a screen display example according to a fifth example of the present embodiment.

FIG. 21 is a diagram illustrating another timeline UI according to the present embodiment.

FIG. 22 is a diagram illustrating another timeline UI according to the present embodiment

MODE(S) FOR CARRYING OUT THE INVENTION

Figure 1:
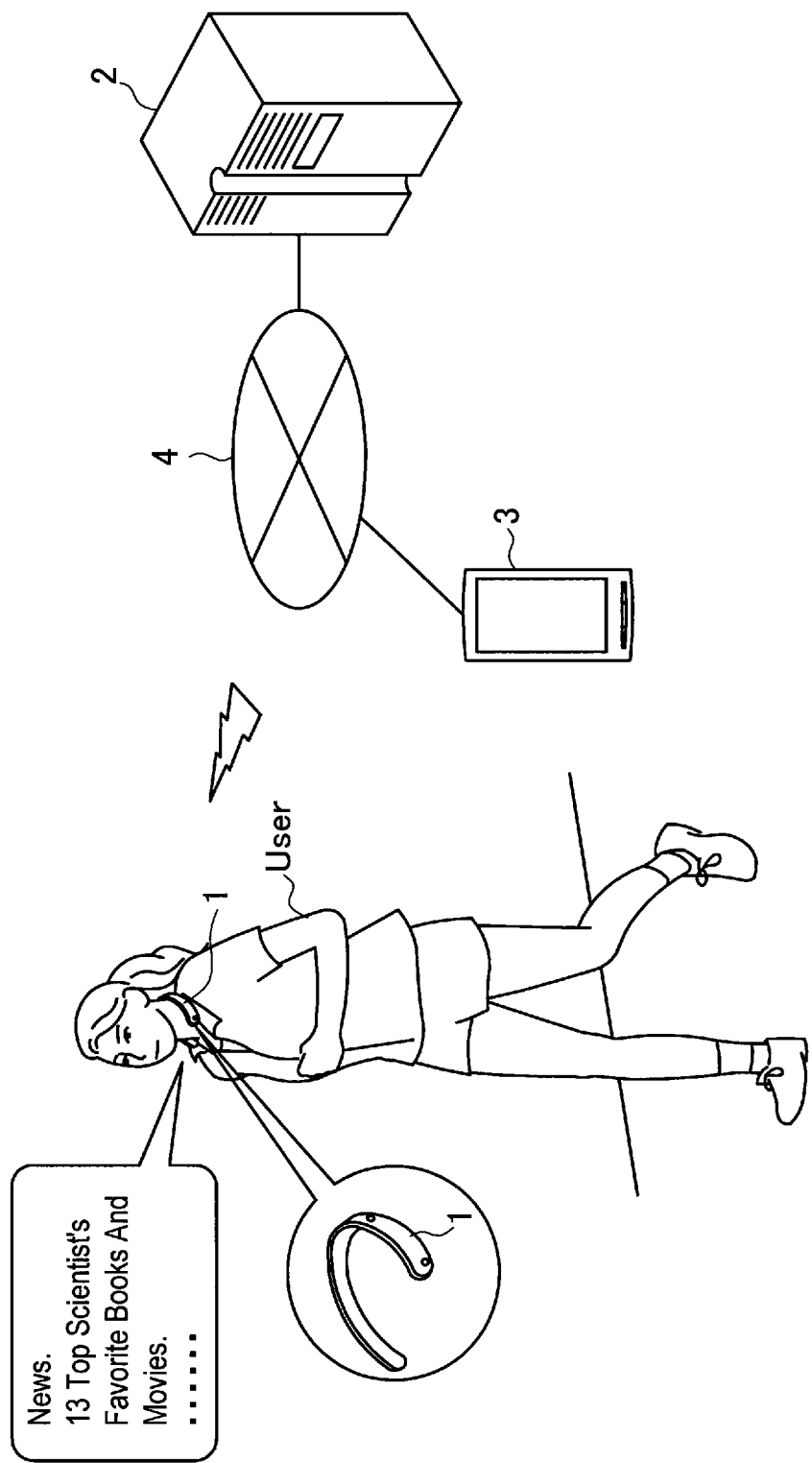
FIG. 1 is a diagram for describing an overview of an information processing apparatus according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, a description will be given in the following order.
1. Overview of information processing system according to an embodiment of the present disclosure
2. Configuration
2-1. Configuration of information processing apparatus 1
2-2. Configuration of server 2
3. Operating processing
3-1. Reading-aloud processing
3-2. Timeline UI generation processing
3-3. Timeline UI display processing
4. Screen display example
4-1. First embodiment
4-2. Second embodiment
4-3. Third embodiment
4-4. Fourth embodiment
4-5. Fifth embodiment
4-6. Others
5. Conclusion

1. OVERVIEW OF INFORMATION PROCESSING SYSTEM ACCORDING TO AN EMBODIMENT OF THE PRESENT DISCLOSURE

First, a description will be given of an overview of an information processing system according to an embodiment of the present disclosure with reference to FIG. 1. FIG. 1 is a diagram illustrating an overview of the information processing system according to the present embodiment.

As illustrated in FIG. 1, the information processing system according to the present embodiment includes an information processing apparatus 1 attached to a user, a server 2, and a display device 3. The information processing apparatus 1, the server 2, and the display device 3 can mutually receive and send data via a network 4. It is noted that the display device 3 may be an information processing terminal such as a smartphone, a mobile phone, a tablet terminal, a notebook PC, or the like that is portable by a user. Further, in a case where the display device 3 is paired to the information processing apparatus 1 in wireless communication connection, the information processing apparatus 1 can receive and send data from/to the server 2 via the display device 3.

The information processing apparatus 1 is, for example, a neckband information processing terminal that is hung around the neck of a user. The neckband information processing apparatus 1 includes a wearable unit (wearable section) shaped to extend around the half of the neck from both sides to the rear side (back side). Hung around the neck of a user, the neckband information processing apparatus 1 is worn by the user. The present specification uses the words up, down, left, right, front, and back to indicate directions, but assumes that these directions indicate directions as viewed from the center (e.g., stomach position) of the body of a user when the user is standing upright. For example, it is assumed that "right" indicates the direction toward the right half of the user's body, and "left" indicates the direction toward the left half of the user's body. "Up" indicates the direction toward the user's head, and "down" indicates the direction toward the feet of the user. In addition, it is assumed that "front" indicates the direction in which the body of the user faces, and "back" indicates the direction on the user's back side.

As illustrated in FIG. 1, the wearable unit may be worn in close contact with the neck of a user or worn with some space from the neck of a user. Note that, as other shapes of the wearable unit that is hung around the neck, for example, a pendant wearable unit worn by a user with a neck strap and a headset wearable unit including a neckband extending on the rear side of a neck instead of a headband worn around a head are possible.

In addition, a use form of the wearable unit may be a form in which the wearable unit is used by being directly worn on a human body. The form in which the wearable unit is used by being directly worn refers to a form in which the wearable unit is used with nothing between the wearable unit and the human body. For example, the case where the wearable unit illustrated in FIG. 1 is worn in contact with the neck skin of a user corresponds to this form. Besides, various forms such as a headset wearable unit and an eyeglass wearable unit that are directly worn around a head are possible. Alternatively, a use form of the wearable unit may be a form in which the wearable unit is used by being indirectly worn on a human body. The form in which the wearable unit is used by being indirectly worn refers to a form in which the wearable unit is used with something between the wearable unit and the human body. For example, the case where the wearable unit illustrated in FIG. 1 is worn in contact with a user via clothing like the wearable unit is worn and hidden under the collar of a shirt or the like corresponds to this form. Besides, various forms such as a pendant wearable unit worn by a user with a neck strap and a brooch wearable unit attached to clothing with a pin or the like are possible.

In addition, the information processing apparatus 1 according to the present embodiment includes a plurality of microphones, a plurality of cameras, and a plurality of speakers. The microphones acquire audio data such as user voice or surrounding environmental sound. The cameras image the surrounding situation and acquire captured data. In addition, the speakers reproduce audio data. The installation positions and the number of these microphones, cameras, and speakers are not particularly limited. For example, there may be provided one or a plurality of microphones (such as a microphone array), cameras, and speakers.

(Background)

Herein, there is a problem that it is impossible to check while "doing something else" in daily life when a wearable device is attached, information search service, entertainment information, an action support information presenting service, or the like is daily received and is presented with visual information. For example, check of visual information while walking, riding a bicycle, or doing housework, or the like is dangerous for temporarily losing the visual sense.

In contrast, in the case of aural information presentation or vocal information presentation, it is possible to check it without the use of the hands or eyes even while "doing something else" in daily life.

In addition, as information to be presented, pull information and push information are conceivable. Pull information is information requested and presented when a user wishes to know, and activated according to a button operation, a screen operation, and a voice operation. In addition, push information is information automatically presented without a user's consciousness, and examples thereof include an e-mail notification, an incoming call, an invocation from an application, a notification, a warning of the remaining battery, and the like.

A push audio notification has a merit that information is automatically presented and, in contract, has a demerit that it takes a longer time to check detailed information. Further, there are demerits that visual information of text, an image, and the like cannot referred to and missing information cannot be easily referred to later.

Accordingly, according to the present embodiment, it is possible to improve the convenience when checking read-aloud audio information.

Specifically, a user position (place name or the like), for example, when presenting the audio information is linked to action and is recorded, and a timeline user interface (UI) for presenting the text of the presented (read-aloud) audio information together with the user action and a position is generated. The presentation time and place of the audio information are easily stored in the memory. Therefore, it is possible to easily search for target information by tracing user's action when the user checks missing information later. Further, in a case where there is interesting information such as wanting to know the details of the information or the like, it is set to enable bookmarking by a voice operation or the like when audio is presented. In this case, the user can easily check interesting audio information later by largely displaying information bookmarked or the like at the timeline UI of the audio information or displaying detailed information (if there is an image, together with the image).

The above description is given of the overview of the information processing apparatus 1 according to the present embodiment. Subsequently, a description will be given of a configuration of the information processing apparatus 1 according to the present embodiment with reference to FIG. 2.

2. CONFIGURATION

2-1. Configuration of Information Processing Apparatus 1

Figure 2:
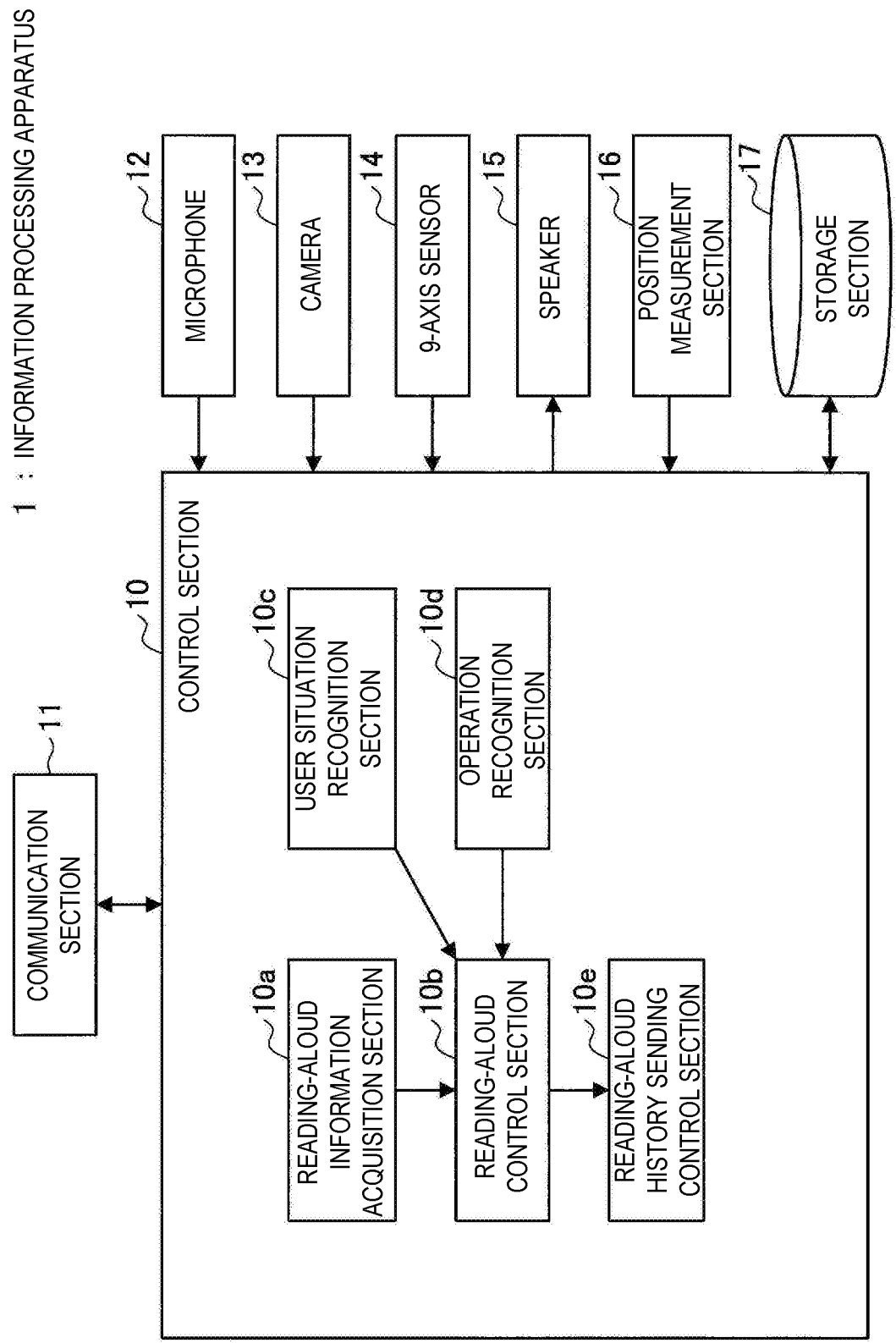
FIG. 2 is a block diagram illustrating an example of a configuration of the information processing apparatus according to the present embodiment.

Next, the configuration of the information processing apparatus 1 according to the present embodiment will be described with reference to FIG. 2. FIG. 2 is a block diagram illustrating an example of the configuration of the information processing apparatus 1 according to the present embodiment. As illustrated in FIG. 2, the information processing apparatus 1 includes a control section 10, a communication section 11, a microphone 12, a camera 13, a 9-axis sensor 14, a speaker 15, a position measurement section 16, and a storage section 17.

(Control Section 10)

The control section 10 functions as an arithmetic processing apparatus and a control apparatus, and controls the overall operation of the information processing apparatus 1 in accordance with a variety of programs. The control section 10 is implemented, for example, by an electronic circuit such as a central processing unit (CPU) and a microprocessor. In addition, the control section 10 may include a read only memory (ROM) that stores a program, an operation parameter and the like to be used, and a random access memory (RAM) that temporarily stores a parameter and the like varying as appropriate.

Further, the control section 10 according to the present embodiment functions as a reading-aloud information acquisition section 10a, a reading-aloud control section 10b, a user situation recognition section 10c, an operation recognition section 10d, and a reading-aloud history sending control section 10e, as illustrated in FIG. 2.

The reading-aloud information acquisition section 10a acquires information that is presented (read aloud) as audio to the user. The reading-aloud information may be received from an external device (e.g., a smartphone) or on a network (e.g., the server 2) by the communication section 11, or be acquired from the storage section 17, or be acquired from an application started by the information processing apparatus 1. Further, the reading-aloud information acquisition section 10a may acquire information by an RSS reader from a web site.

The reading-aloud control section 10b controls to output the audio of the reading-aloud information acquired by the reading-aloud information acquisition section 10a from the speaker 15. For example, the reading-aloud control section 10b combines the audio on the basis of reading-aloud information (text information), sets the reading-aloud information as audio, outputs the generated audio information from the speaker 15, and presents the information to the user. Further, the reading-aloud control section 10b controls to read aloud a part of the acquired reading-aloud information (only title, from title to summary, from title to the first sentence in the body text, or the like) (that is, output the audio), in a case of determining that additional reading-aloud is necessary on the basis of the user operation, the output of the reading-aloud information is further controlled.

The user situation recognition section 10c recognizes the user situation on the basis of various sensor information. Specifically, the user situation recognition section 10c recognizes a position or action of a user (running, walking, riding a bicycle, or the like) by using at least one of user voice or surrounding environmental sound collected by the microphone 12, a surrounding captured image captured by the camera 13, a sensor value (acceleration sensor value, a gyro sensor value, geomagnetic sensor value, or the like) detected by the 9-axis sensor 14 and position information acquired by the position measurement section 16. Further, the user situation recognition section 10c can recognize not only action (low context) of walking, bicycle, running, still, a vehicle, or the like but also high context of action. High context of action is a result of specifically recognizing action content, for example, home, going home, a way to work, office, going-out, and the like.

The operation recognition section 10d recognizes an operation input of the user. For example, the operation recognition section 10d performs speech recognition on voice of the user collected by the microphone 12, and receives an operation instruction with user's voice. As the voice operation of the user, for example, "Skip, More, Bookmark, Again, Previous" are conceivable. "Skip" means an instruction for advance to the next audio information, "More" means an instruction for requesting more specific information, "Bookmark" means an instruction for putting a mark to the current audio information, "Again" means an instruction for reproducing again the current audio information from the first (repetition instruction), and "Previous" means an instruction for returning to previous information.

The reading-aloud history sending control section 10e controls to send a history (hereinbelow, referred to as "reading-aloud history") of read reading-aloud information whose audio output is controlled by the reading-aloud control section 10b from the communication section 11 to the server 2. The reading-aloud history includes a situation (time, position, action (high context, low context)) at reading-aloud time, operation, the reading-aloud information, the read-aloud information (part whose audio is actually output from the reading-aloud information).

(Communication Section 11)

The communication section 11 is a communication module for transmitting and receiving data to and from another apparatus in a wired/wireless manner. The communication section 11 wirelessly communicates with an external apparatus directly or via a network access point in a scheme, for example, a wired local area network (LAN), a wireless LAN, Wireless Fidelity (Wi-Fi)®, infrared communication, Bluetooth®, short-range/contactless communication, and the like.

(Microphone 12)

The microphone 12 picks up user voice or surrounding environmental sound, and outputs it to the control section 10 as audio data.

(Camera 13)

The camera 13 includes a lens system including an imaging lens, a diaphragm, a zoom lens, a focus lens and the like, a driving system that causes the lens system to perform a focus operation and a zoom operation, a solid-state image sensor array for generating an imaging signal from photoelectric conversion of imaging light obtained in the lens system, and the like. The solid-state image sensor array may be implemented, for example, by a charge coupled device (CCD) sensor array and a complementary metal oxide semiconductor (CMOS) sensor array. For example, the camera 13 is provided to be capable of imaging the area in front of a user with the information processing apparatus 1 (wearable unit) worn by the user. In this case, the camera 13 becomes capable of imaging the scenery surrounding the user, or the scenery in the direction in which the user is looking. In addition, the camera 13 may also be provided to be capable of imaging the face of a user with the information processing apparatus 1 worn by the user. In this case, the information processing apparatus 1 becomes capable of identifying a line-of-sight direction or an expression of the user from a captured image. In addition, the camera 13 outputs the data of a captured image which is converted into a digital signal to the control section 10.

(9-Axis Sensor 14)

The 9-axis sensor 14 includes a triaxial gyro sensor (which detects angular velocity (rotation velocity)), a triaxial acceleration sensor (which is also be referred to as G sensor, and detects acceleration when moving), and a triaxial geomagnetic sensor (which is a compass and detects an absolute direction (azimuth)). The 9-axis sensor 14 has a function of performing sensing on a state of a user wearing the information processing apparatus 1 or a surrounding state. Note that the 9-axis sensor 14 is an example of a sensor section. The present embodiment is not limited thereto. For example, a velocity sensor, a vibration sensor, or the like may be further used. At least any of an acceleration sensor, a gyro sensor, and a geomagnetic sensor may be used. In addition, the sensor section may be provided to an apparatus different from the information processing apparatus 1 (wearable unit), or distributed to a plurality of apparatuses. For example, an acceleration sensor, a gyro sensor, and a geomagnetic sensor may be provided to a device (e.g., earphone) worn on a head, and a velocity sensor and a vibration sensor may be provided to a smartphone. The 9-axis sensor 14 outputs information indicating a sensing result (sensor information) to the control section 10.

(Speaker 15)

The speaker 15 reproduces an audio signal processed by the reading-aloud control section 10b under control of the control section 10. The speaker 15 may have a directivity.

(Position Measurement Section 16)

The position measurement section 16 has a function of detecting the current position of the information processing apparatus 1 on the basis of an externally acquired signal. Specifically, for example, the position measurement section 16 is implemented by a global positioning system (GPS) measurement section, receives radio waves from a GPS satellite, detects the position of the information processing apparatus 1, and outputs the detected position information to the control section 10. In addition, the information processing apparatus 1 may sense the position, for example, in accordance with Wi-Fi®, Bluetooth®, transmission and reception to and from a mobile phone/PHS/smartphone or the like, short-range communication, or the like in addition to the GPS.

(Storage Section 17)

The storage section 17 stores a program or a parameter for executing functions by the above-mentioned control section 10. Further, the storage section 17 according to the present embodiment may store reading-aloud history to be sent to the server 2.

The above specifically describes the internal configuration example of the information processing apparatus 1 according to the present embodiment.

2-2. Configuration of Server 2

Figure 3:
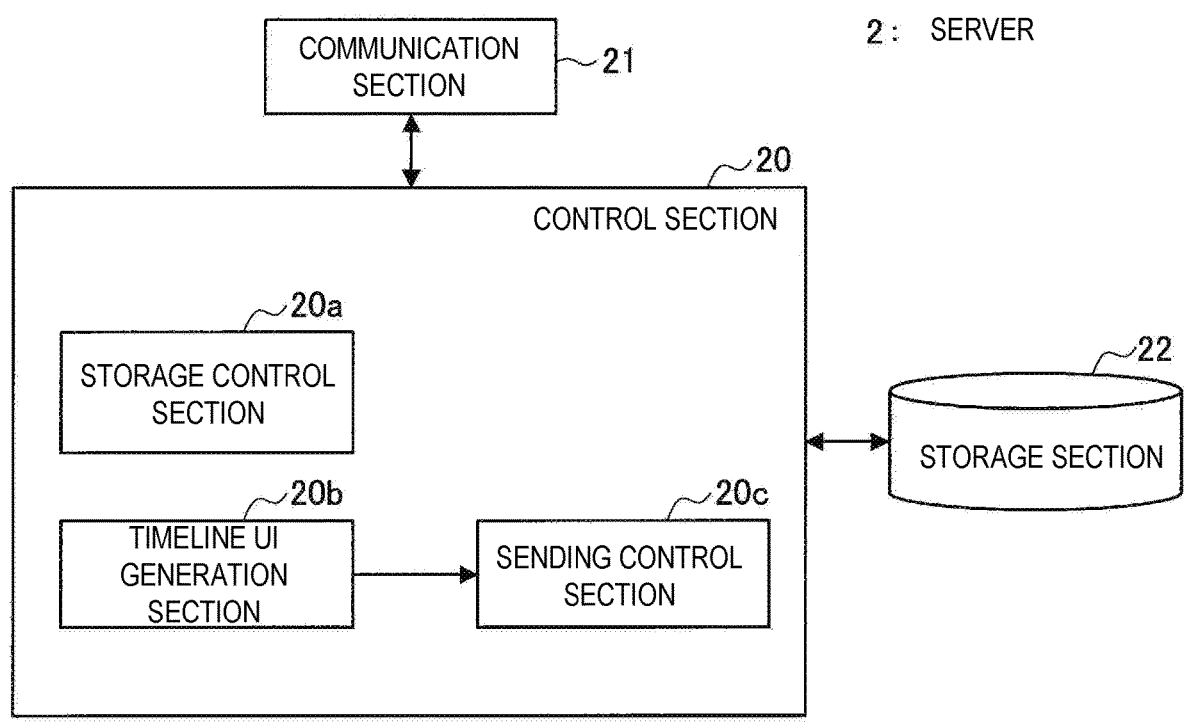
FIG. 3 is a block diagram illustrating an example of a configuration of a server according to the present embodiment.

Next, a description will be given of a configuration of the server 2 according to the present embodiment with reference to FIG. 3. FIG. 3 is a block diagram illustrating a configuration of the server 2 according to the present embodiment. As illustrated in FIG. 3, the server 2 has a control section 20, a communication section 21, and a storage section 22.

(Control Section 20)

The control section 20 functions as an arithmetic processing apparatus and a control apparatus, and controls the overall operation of the server 2 in accordance with a variety of programs. The control section 20 is implemented, for example, by an electronic circuit such as a CPU and a microprocessor. In addition, the control section 20 may include a ROM that stores a program, an operation parameter and the like to be used, and a RAM that temporarily stores a parameter and the like varying as appropriate.

Further, the control section 20 according to the present embodiment functions as a storage control section 20a, a timeline UI generation section 20b, and a sending control section 20c, as illustrated in FIG. 3.

The storage control section 20a controls to store the reading-aloud history that is sent from the information processing apparatus 1 and received by the communication section 21 to the storage section 22.

The timeline UI generation section 20b generates the timeline UI presented when checking the reading-aloud information later by the user on the basis of the reading-aloud history stored in the storage section 22. A description will be given of an example of the timeline UI to be generated with reference to FIGS. 8 to 22.

The sending control section 20c controls to send the timeline UI generated from the communication section 21 to the display device 3 (e.g., a smartphone of the user).

(Communication Section 21)

The communication section 21 is a communication module for sending and receiving data to/from another device by wired/wireless manner. For example, the communication section 21 is connected to the information processing apparatus 1 via the network 4 to receive the reading-aloud history. Further, the communication section 21 is connected to the display device 3 via the network 4 to send the timeline UI generated by the control section 20.

(Storage Section 22)

The storage section 22 stores a program or a parameter for executing functions by the above-mentioned the control section 20. Further, the storage section 22 according to the present embodiment stores the reading-aloud history sent from the information processing apparatus 1. Herein, a description will be given of a data example of the reading-aloud history with reference to FIG. 4.

FIG. 4 is a diagram illustrating an example of reading-aloud history data according to the present embodiment. As illustrated in FIG. 4, the reading-aloud history data is stored with correspondence to, e.g., reading date and time, position (e.g., latitude/longitude information), a position name, high context of action, low context of action, operation (operation input by the user), the reading-aloud information, and the read-aloud information. The position name can be acquired by referring to map data on the basis of, e.g., latitude/longitude information. The position name may be recognized by the user situation recognition section 10c in the information processing apparatus 1 or on the side of the server 2.

Further, the "reading-aloud information" indicates an acquiring source of the reading-aloud information (e.g., in a case of acquiring on a network, URL thereof). The information that has been actually read aloud is stored as "read-aloud information".

The above description is given of the example of the configuration of the server 2 according to the present embodiment.

It is noted that the configuration of the information processing system according to the present embodiment is not limited to the example illustrated in FIG. 1, the configuration of the above-mentioned server 2 may be provided for the display device 3 realized by an information processing terminal such as a smartphone to form a system configuration having the information processing apparatus 1 and the display device 3.

Subsequently, a description will be given of operating processing according to the present embodiment with reference to FIGS. 5 to 7.

3. OPERATING PROCESSING

3-1. Reading-Aloud Processing

Figure 5:
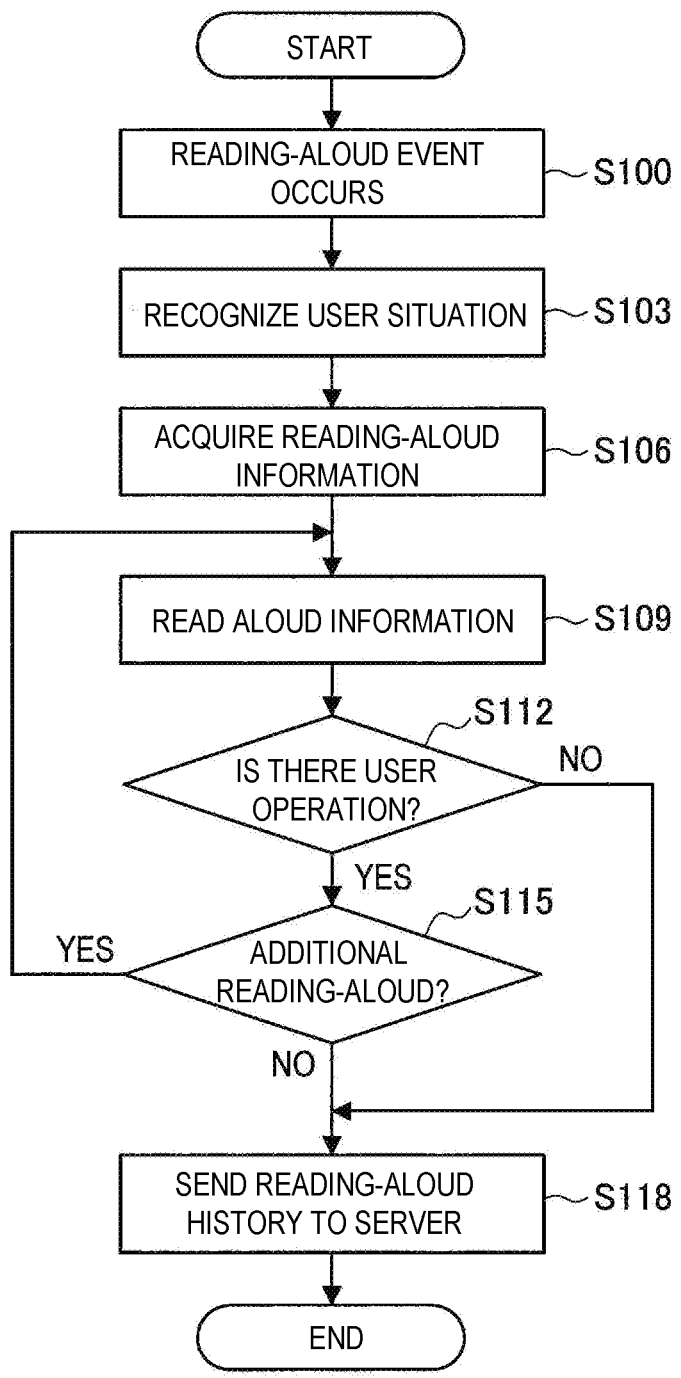
FIG. 5 is a flowchart illustrating reading-aloud processing with an information processing apparatus 1 according to the present embodiment.

FIG. 5 is a flowchart illustrating reading-aloud processing of the information processing apparatus 1 according to the present embodiment. As illustrated in FIG. 5, first of all, a reading event occurs (step S100), and the information processing apparatus 1 recognizes the user situation by the user situation recognition section 10c (step S103). The reading-aloud event occurs at preset time, periodically, non-periodically, in a case of acquiring new information, or the like. For example, a reading-aloud event of the latest news or event information may occur at determined time in one day. Further, a reading-aloud event may occur in a case where the user situation is continuously recognized and a recognition result satisfies a predetermined condition. As mentioned above, the user situation can be recognized on the basis of various information acquired from the microphone 12, the camera 13, the 9-axis sensor 14 (an acceleration sensor, a gyro sensor, a geomagnetic sensor, or the like), a position measurement section 16 (GPS, or the like). For example, the user situation recognition section 10c recognizes the user position, high context or low context of action, or the like.

Subsequently, the information processing apparatus 1 acquires the reading-aloud information (step S106).

Subsequently, the information processing apparatus 1 performs reading control of the information (that is, audio output control from the speaker 15) (step S109).

Subsequently, in a case of recognizing the user operation during reading aloud the information (step S112/Yes), the reading-aloud control section 10b in the information processing apparatus 1 determines whether or not additional reading is performed (step S115). As mentioned above, the user operation during reading aloud the information includes, e.g., Skip, More, Bookmark, Again, and Previous. Further, "More" is an instruction for requesting more specific information, and the information processing apparatus 1 therefore performs additional reading-aloud.

Further, the reading is finished and the information processing apparatus 1 sends, to the server 2, the reading-aloud history including reading-aloud date and time and position, high context and low context of action, the user operation during reading aloud (Skip, More, Bookmark, Again, Previous), the reading-aloud information, and the read-aloud information (step S118).

3-2. Timeline UI Generation Processing

Figure 6:
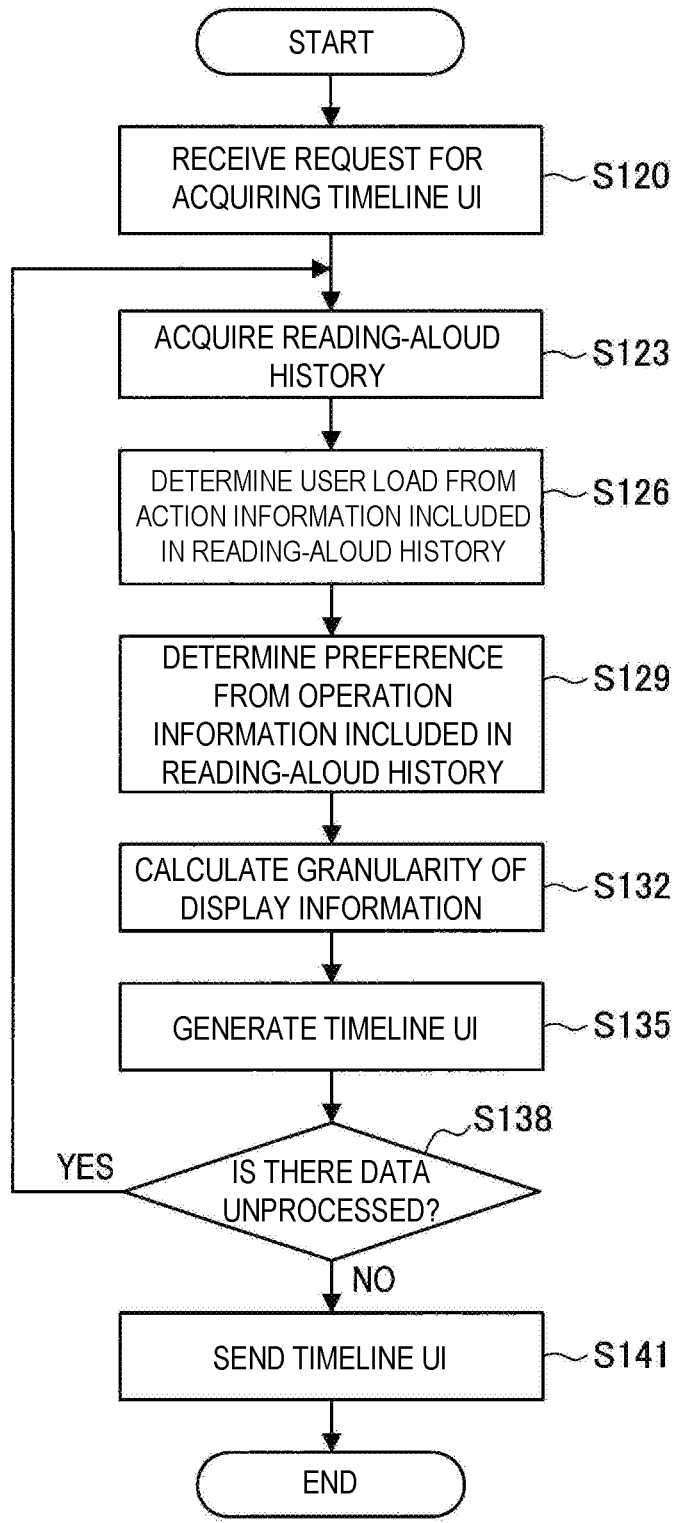
FIG. 6 is a flowchart illustrating timeline UI generation processing by a server according to the present embodiment.

FIG. 6 is a flowchart illustrating timeline UI generation processing of the server 2 according to the present embodiment. As illustrated in FIG. 6, first of all, the server 2 receives a request for acquiring the timeline UI from an external device (herein, the display device 3 is used) (step S120), and acquires the reading-aloud history of a target user stored in the storage section 17 (step S123).

Subsequently, the timeline UI generation section 20b of the server 2 determines user load on the basis of action information (high context and low context) included in the reading-aloud history (step S126). In the specification, the user load indicates a degree of a situation in which it is hard for the user to listen to the audio information (it is hard to concentrate on the audio information). For example, since the user concentrates on running or riding during the running or cycling, such a situation is determined that the user load is high, that is, it is hard to listen to the audio information. Further, it is determined that the user load is not higher during the walking than the running or cycling. Further, such a situation is determined that the user load is lower during getting on a train than walking, that is, it is easier to listen to the audio information.

Subsequently, the timeline UI generation section 20b determines preference to the audio information of the user on the basis of operation information included in the reading-aloud history (step S129). For example, in a case of performing a "Skip" operation, negative determination (it is determined that the user does not like (is not interested in) the information). In a case of performing a "More", "Bookmark", or "Again" operation, positive determination is performed (it is determined that the user likes (is interested in) the information). Further, in a case of performing a "Previous" operation, or in a case of performing no operation, neither negative nor positive determination is performed.

Subsequently, the timeline UI generation section 20b calculates the granularity of display information on the basis of the user load or a preference determining result (step S132). The granularity of the information indicates how specifically (only title is displayed, both title and body text are displayed, or the like) the audio information is displayed on the timeline UI. In a case where the user load is high or positive determination is performed, for example, the timeline UI generation section 20b determines that the granularity is "large", the granularity is "middle" in a case where the user load is middle or there is no preference determination, and the granularity is "small" in a case where the user load is low or negative determination is performed.

Subsequently, the timeline UI generation section 20b generates the timeline UI on the basis of various information included in the calculated granularity information or the reading-aloud history (step S135). For example, the timeline UI generation section 20b arranges in chronological order an icon, a position name, and time indicating high context of action of the user at reading-aloud time and the reading-aloud information. Further, the timeline UI generation section 20b controls how specifically the reading-aloud information is displayed depending on the calculated granularity information. For example, in a case where the granularity is "large", the title and all body text are displayed. In a case where the granularity is "middle", the title and the first sentence of the body text are displayed. In a case where the granularity is "small", only the title may be displayed. A description is given of processing in a case of generating the timeline UI on the basis of the user load, the preference determining result, and the granularity information in the operating processing illustrated in FIG. 6. The embodiment is not limited to this. For example, the read-aloud information or captured image captured at reading-aloud time may be displayed in chronological order. A description will be given of an example of the above-mentioned various timelines UI.

Subsequently, the processing is returned to step S123 in a case where there is non-processed data (step S138). For example, the above steps S123 to S135 are repeated until performing all processing of the reading-aloud history in one day.

Further, the server 2 sends the generated timeline UI to an external device on the source of the request for acquiring the timeline UI, e.g., the display device 3 (step S141).

3-3. Timeline UI Display Processing

Figure 7:
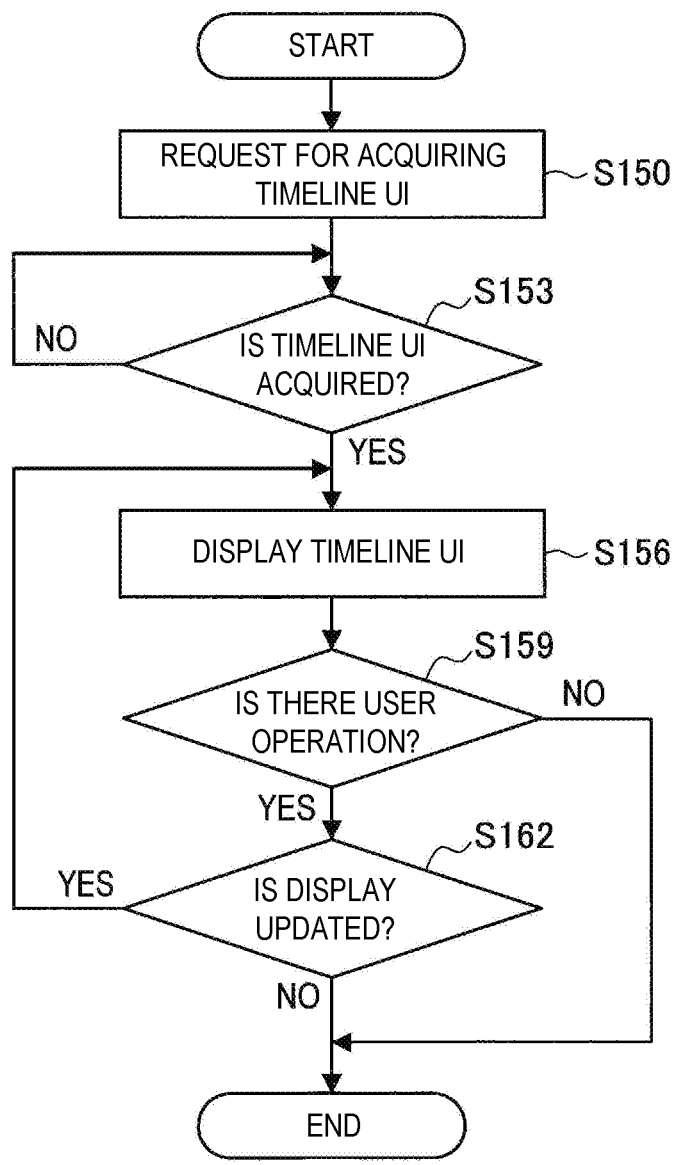
FIG. 7 is a flowchart illustrating timeline UI generation processing by a display device according to the present embodiment.

FIG. 7 is a flowchart illustrating timeline UI display processing by the display device 3 according to the present embodiment. As illustrated in FIG. 7, first of all, the display device 3 issues a request for acquiring the timeline UI to the server 2 (step S150).

Subsequently, the display device 3 acquires the timeline UI from the server 2 (step S153/Yes), and displays the timeline UI on a display section (step S156).

Subsequently, in a case where the user operation is performed to the timeline UI (step S159/Yes), the display device 3 determines whether or not display is to be updated with the user operation (step S162).

Further, in a case of performing the determination for updating the display (step S162/Yes), the display device 3 is returned to step S156, and updates the display of the timeline UI. For example, in a case where the user taps a map displayed with the timeline UI on a touch panel display of the display device 3, the display device 3 updates the display by scrolling the timeline UI to display the audio information read at the tapping position.

4. SCREEN DISPLAY EXAMPLE

Subsequently, a description will be given of an example of a screen display of the timeline UI with a plurality of examples according to the present embodiment.

4-1. First Example

Figure 8:
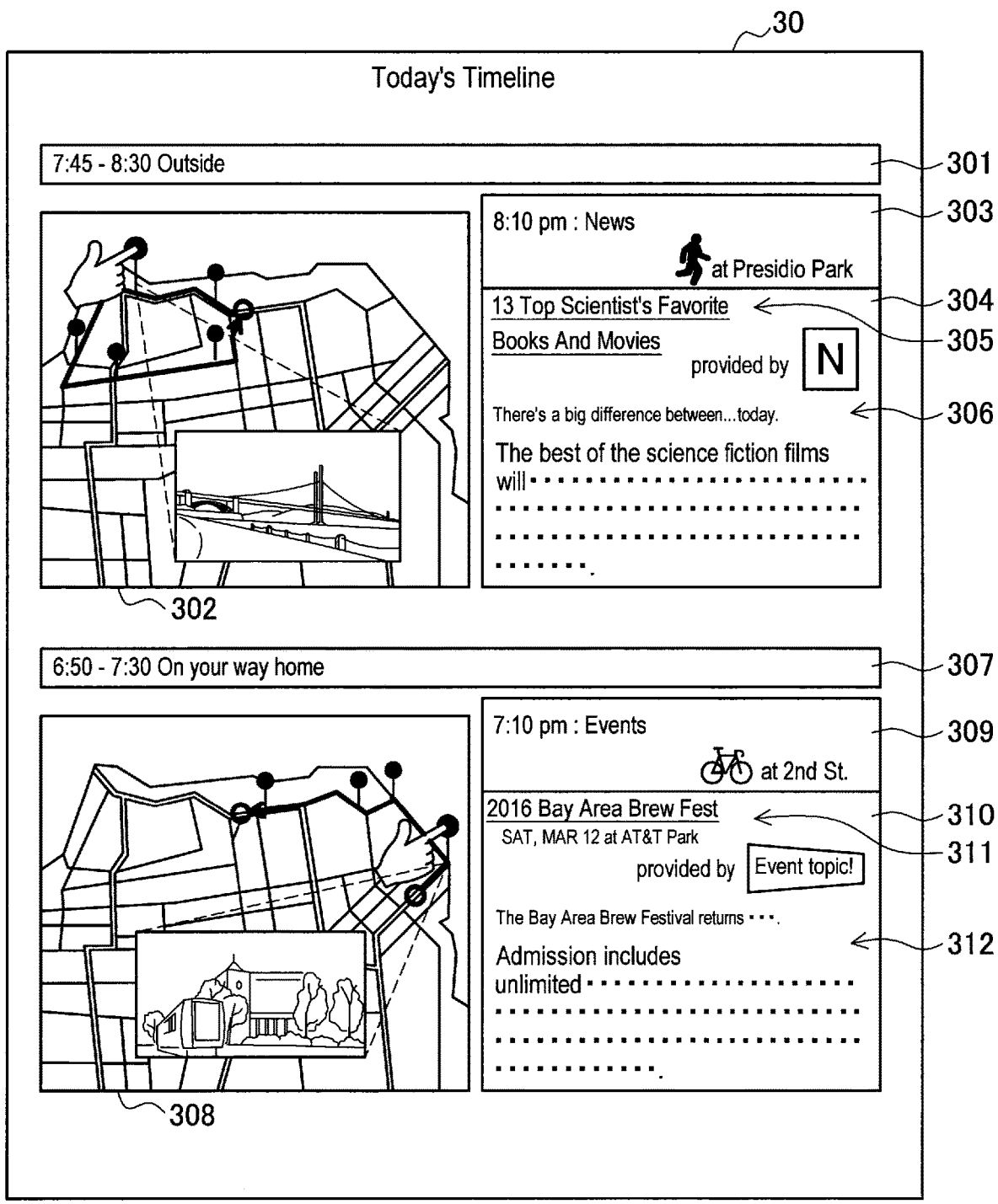
FIG. 8 is a diagram illustrating a screen display example according to a first example of the embodiment.

FIG. 8 is a diagram illustrating a screen display example according to a first example according to the present embodiment. First of all, the timeline UI according to the present embodiment displays a display column including a one-timeline map image (map image illustrating a timeline locus) for every switching of the user action (high context). For example, in the example illustrated in FIG. 8, a display column of "6:50-7:30 On your way home" and a display column of "7:45-8:30 Outside" are displayed in chronological order on a display screen 30. In the example illustrated in FIG. 8, only the two display columns of "On your way home" and "Outside" are displayed. By scrolling the screen, a display column at another action time is displayed.

The display column of "Outside" includes a display image 301 of "7:45-8:30 Outside" indicating high context of time and action, a map image 302, a display 303 of the information about the reading-aloud, and a display 304 of the reading-aloud information. The reading-aloud information displayed on the display 303 of the information about the reading-aloud and the display 304 of the reading-aloud information is information read-aloud near point that is arbitrarily tapped at points of a timeline locus on the map (moving path at the time of corresponding action, here, moving path at "Outside" time). On the timeline locus, the pin is displayed at a point for reading aloud the information. Further, a captured image near the arbitrarily tapped point (captured image captured by the camera 13 in the information processing apparatus 1 when the user moves at the point) is displayed. Further, the captured images at each point may be sequentially displayed when the user slides a timeline locus by tracing with a finger. The user can easily search for information with scenery as a clue while a scenery reflected on the captured image, like desiring to check again information that has been heard at the time of staying at the place.

Subsequently, a description will be given of displayed reading-aloud information. The display 303 of the information about the reading includes displays of reading-aloud time, a type of the reading-aloud information (news, event, or the like), low context of action (running, walking, riding a bicycle, getting on a train, or the like), and a place (position name). Further, on the display 304 of the reading-aloud information, text of the read-aloud information is displayed. For example, in a case of news information, as illustrated in FIG. 8, a title display 305, an information presenting source, and body text 306 are displayed. The title display 305 is linked to, for example, an information presenting source (e.g., news site). The user taps the title display 305, and the screen transitions to a news site.

Further, regarding the body text 306 illustrated in FIG. 8, a read-aloud sentence (read-aloud information) is displayed to be small, and an unread sentence is displayed to be large. For example, in a case where only the title and the first sentence of the body text are read at the reading-aloud time, the second sentence or after is displayed to be large. As mentioned above, the unread-aloud information is emphasized and displayed. Herein, also as an example of an emphasizing display, a display form for enlarging a character is used. However, the embodiment is not limited to this, and emphasis display may be performed by setting a color to a different one, changing a typeface, changing a background, adding animation, or the like. Such a situation that the user checks the audio information later leads to an assumption that the user gets interested in the presented audio information and wants to know more details. Therefore, when checking the audio information, by intuitively recognizing from where the information is not heard, the convenience is further improved.

The display column of "On your way home" is similarly displayed, that is, includes a display image 307 of "7:45-8:30 Outside" indicating high context of time and action, a map image 308, a display 309 of the information about reading-aloud, and a display 310 of the reading-aloud information. Regarding the display 310 of the reading-aloud information, in a case of, e.g., event information as text of the read-aloud information, as illustrated in FIG. 8, a title display 311, the information presenting source, and body text 312 are similarly displayed. Regarding the body text 312, unread-aloud information (second sentence or after in the body text) is emphasized and displayed (character size is displayed to be large).

Subsequently, a description will be given of screen transition of the timeline UI according to the present embodiment with reference to FIGS. 9 to 14. FIGS. 9 to 14 are diagrams illustrating the screen transition of the timeline UI according to the present embodiment.

Figure 9:
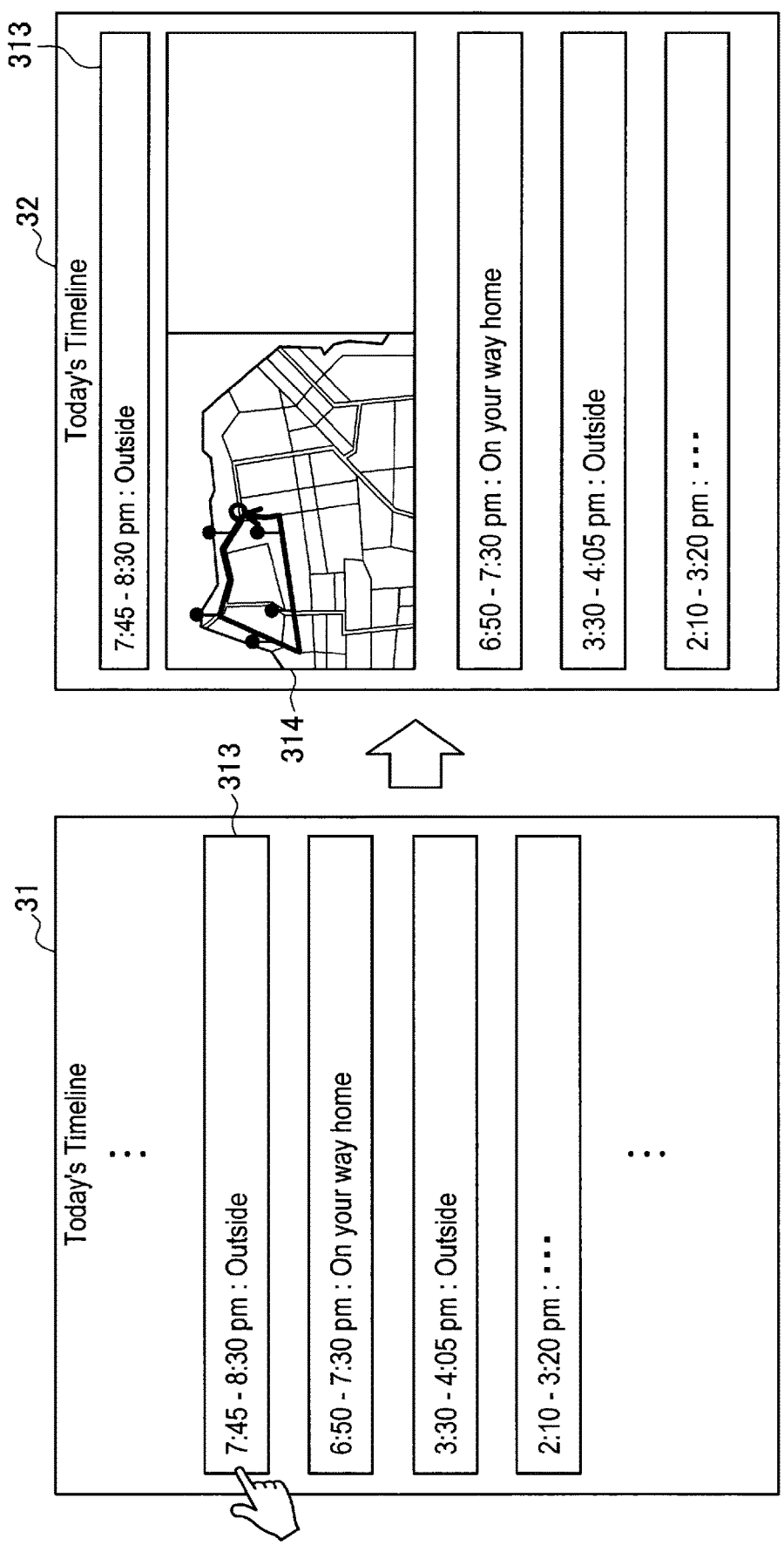
FIG. 9 is a diagram illustrating screen transition of timeline UI according to the first example of the embodiment.

As illustrated in FIG. 9, as "Today's Timeline", items indicating high context of the user action of all day today are first displayed on a screen 31 in chronological order. The user taps any of items and a map image indicating the timeline locus at the action time is displayed. For example, as illustrated in FIG. 9, "7:45-8:30 pm: Outside" (Outside) is tapped in the items, and a map image 314 indicating the timeline locus at the time of Outside is displayed as illustrated in a screen 32 on the right of FIG. 9.

Figure 10:
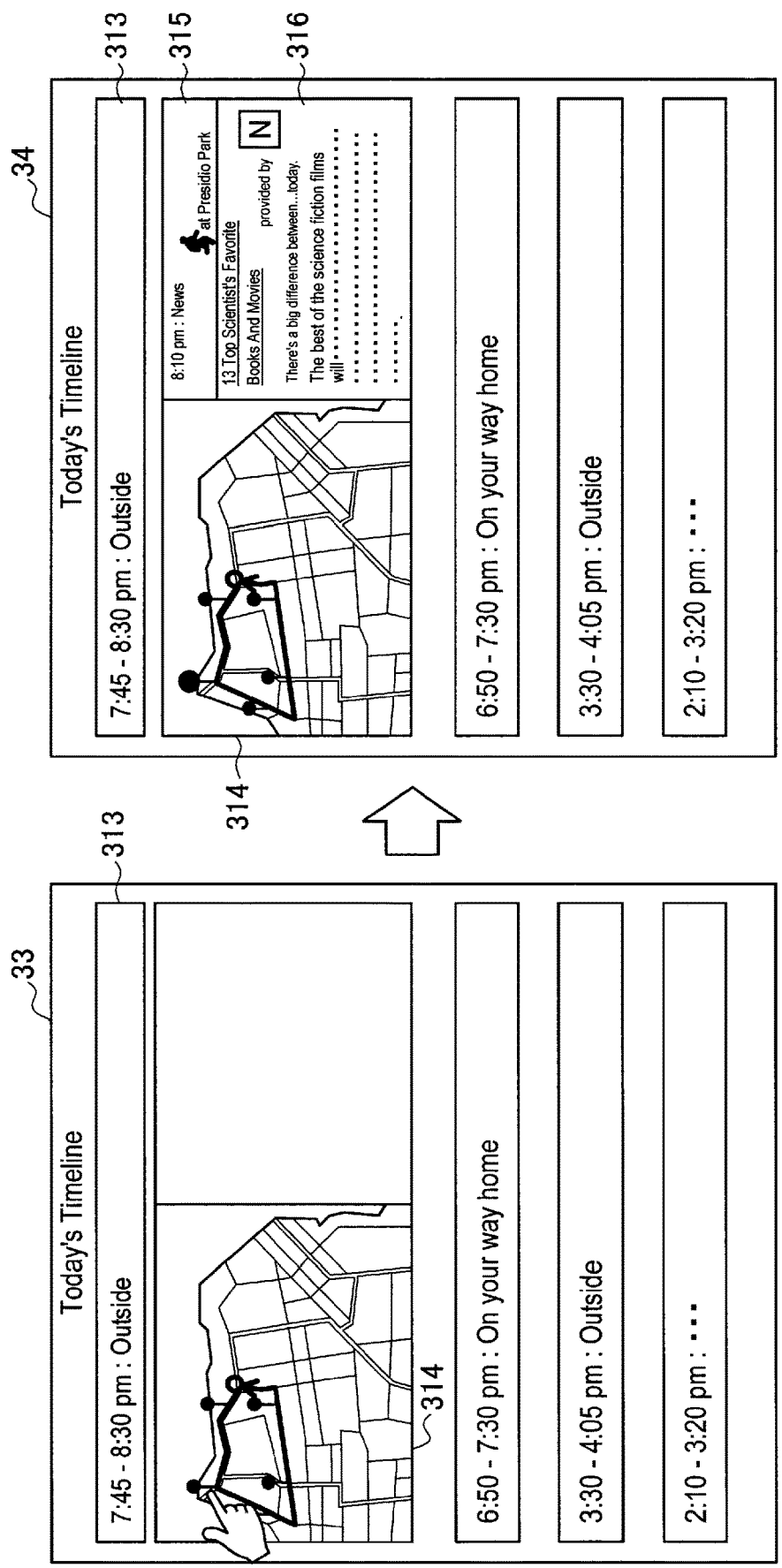
FIG. 10 is a diagram illustrating screen transition of timeline UI according to the first example of the embodiment.

Subsequently, as illustrated in a screen 33 on the left in FIG. 10, the user taps an arbitrary point on the timeline locus. A pin standing on the timeline locus indicates a point where the information is read aloud. The user taps an arbitrary point, and information read aloud at the tapped point (including a display 315 of the information about the reading-aloud and a display 316 of the reading-aloud information) is displayed, as illustrated in a screen 34 on the right in FIG. 10.

Figure 11:
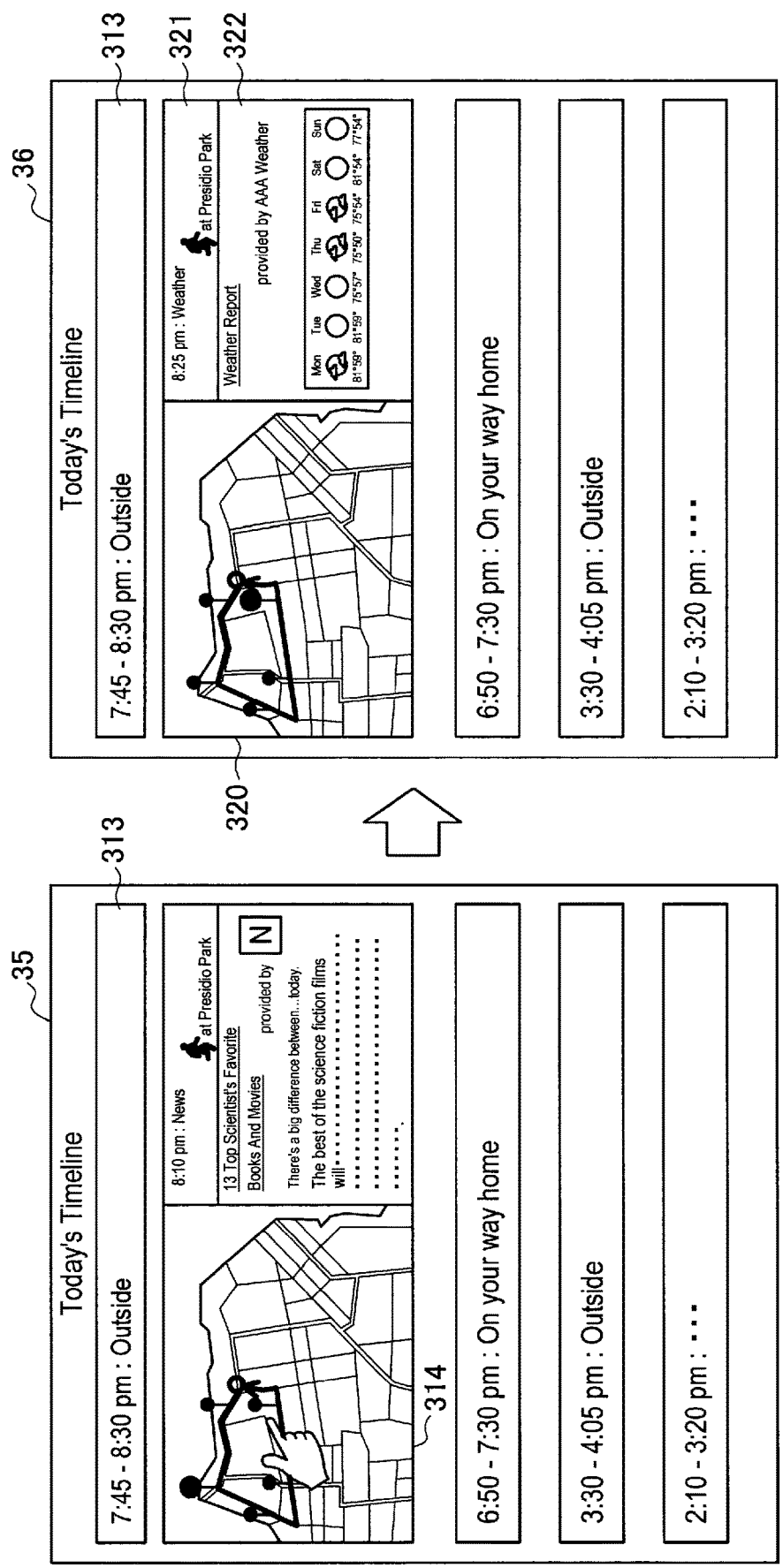
FIG. 11 is a diagram illustrating screen transition of timeline UI according to the first example of the embodiment.

Subsequently, another point is tapped on the timeline locus of the map image 314 as illustrated in a screen 35 on the left of FIG. 11, and an audio information presenting screen on the right of the screen is switched to information of the tapped point (a display 321 of the information about the reading-aloud and a display 322 of the reading-aloud information), as illustrated in a screen 36 on the right of FIG. 11. Herein, as an example, weather report information read aloud when running in a park at 8:25 is displayed.

Figure 12:
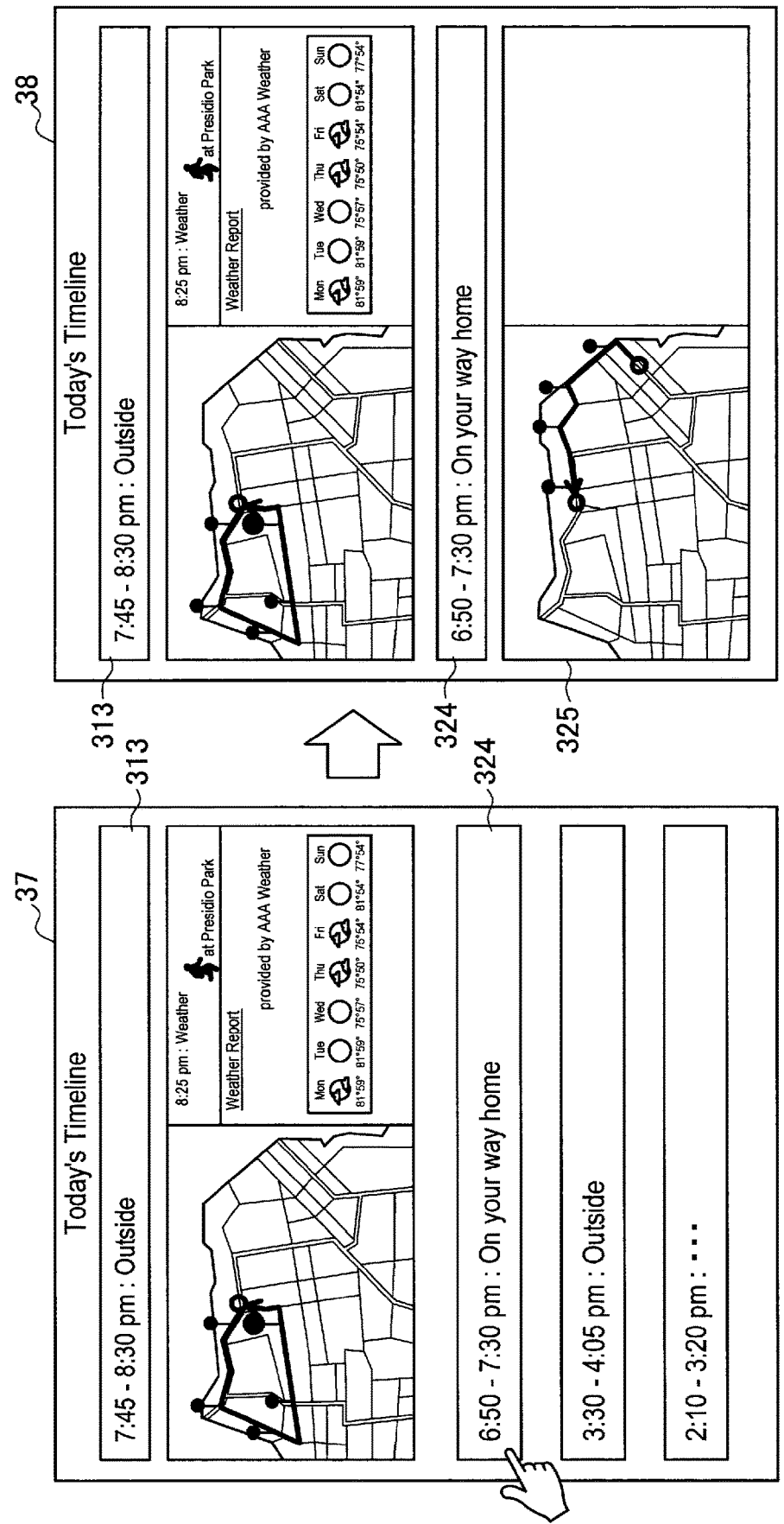
FIG. 12 is a diagram illustrating screen transition of timeline UI according to the first example of the embodiment.

Subsequently, as illustrated in, for example, a screen 37 on the left of FIG. 12, an item 324 ("6:50-7:30 pm: On your way home" (back to home)) of another high context is tapped, and a map image 325 indicating the timeline locus at the time of back to home is displayed as illustrated in a screen 38 on the right of FIG. 12.

Figure 13:
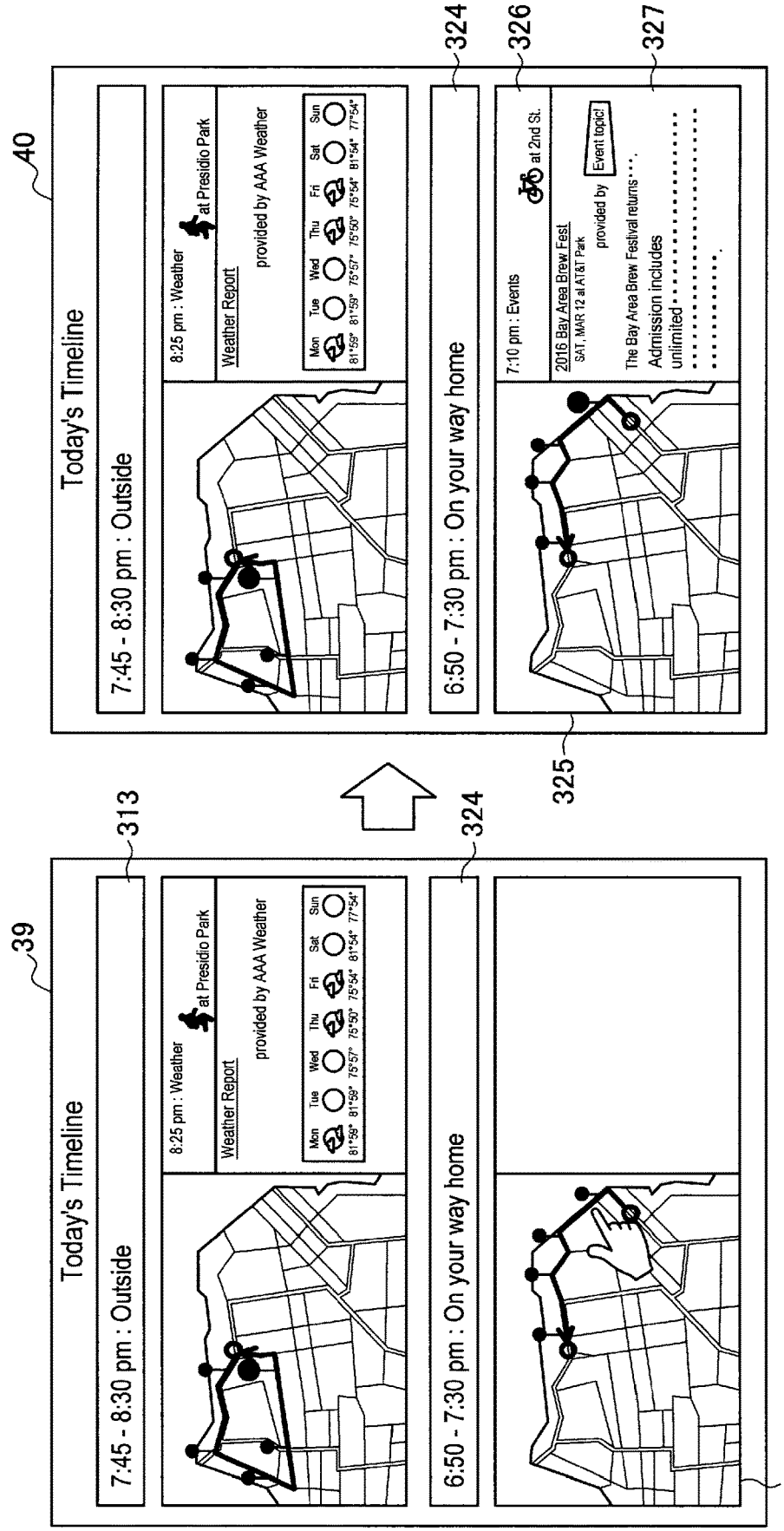
FIG. 13 is a diagram illustrating screen transition of timeline UI according to the first example of the embodiment.

Subsequently, as illustrated in a screen 39 on the left of FIG. 13, an arbitrary point on the timeline locus at the time of back-to-home illustrated in a map image 325 is tapped, and information read aloud at the tapped point (including a display 326 of the information about the reading-aloud and a display 327 of the information about the reading) is displayed as illustrated on the right of FIG. 13. Herein, as an example, event information read aloud when riding a bicycle on "2nd St" at 7:10 is displayed.

Figure 14:
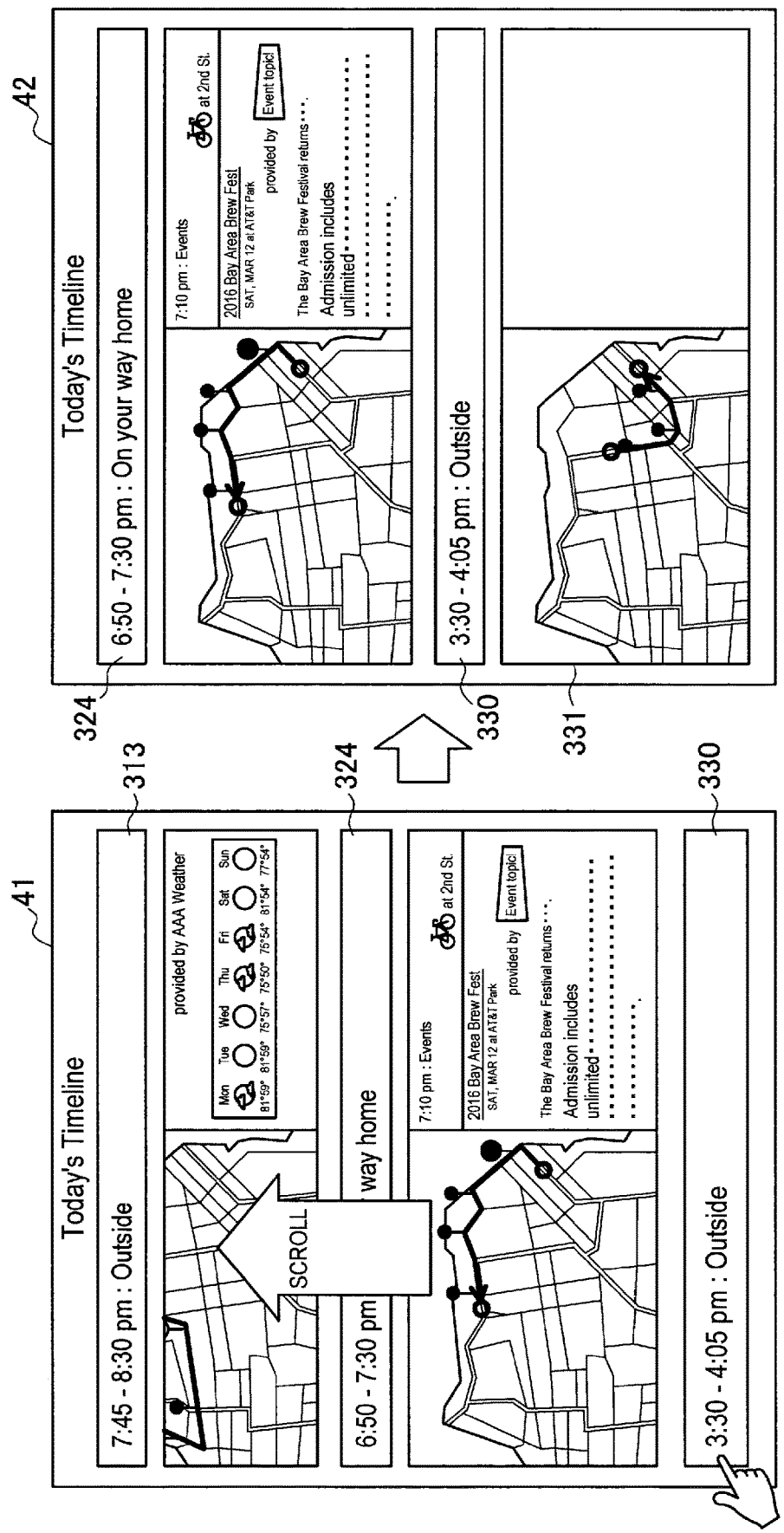
FIG. 14 is a diagram illustrating screen transition of timeline UI according to the first example of the embodiment.

Subsequently, in a case of checking the audio information presented at another action time, the user performs a scroll operation on a screen, allows an item 330 ("3:30-4:05 pm: Outside" (Outside)) of another high context to be displayed, as illustrated on a screen 41 on the left of FIG. 14. The item 330 is tapped, and a map image 331 illustrating the timeline locus at the Outside time, as illustrated on a screen 42 on the right of FIG. 14 is displayed. Similarly to the above-mentioned case, an arbitrary point on the timeline locus of the map image 331 is tapped, and information read aloud at the point is displayed on the right of the map image 331, The above specific description is given of screen transition of the timeline UI according to the present embodiment. Hereinbelow, a description will be given of a modification of the present embodiment.

(Modification)

A description will be given of a modification in a case of displaying text of audio information with a map image indicating the timeline locus with reference to FIG. 15. According to the modification, a situation at the time of presenting the audio is reproduced, thereby supporting to search for information of the user.

Figure 15:
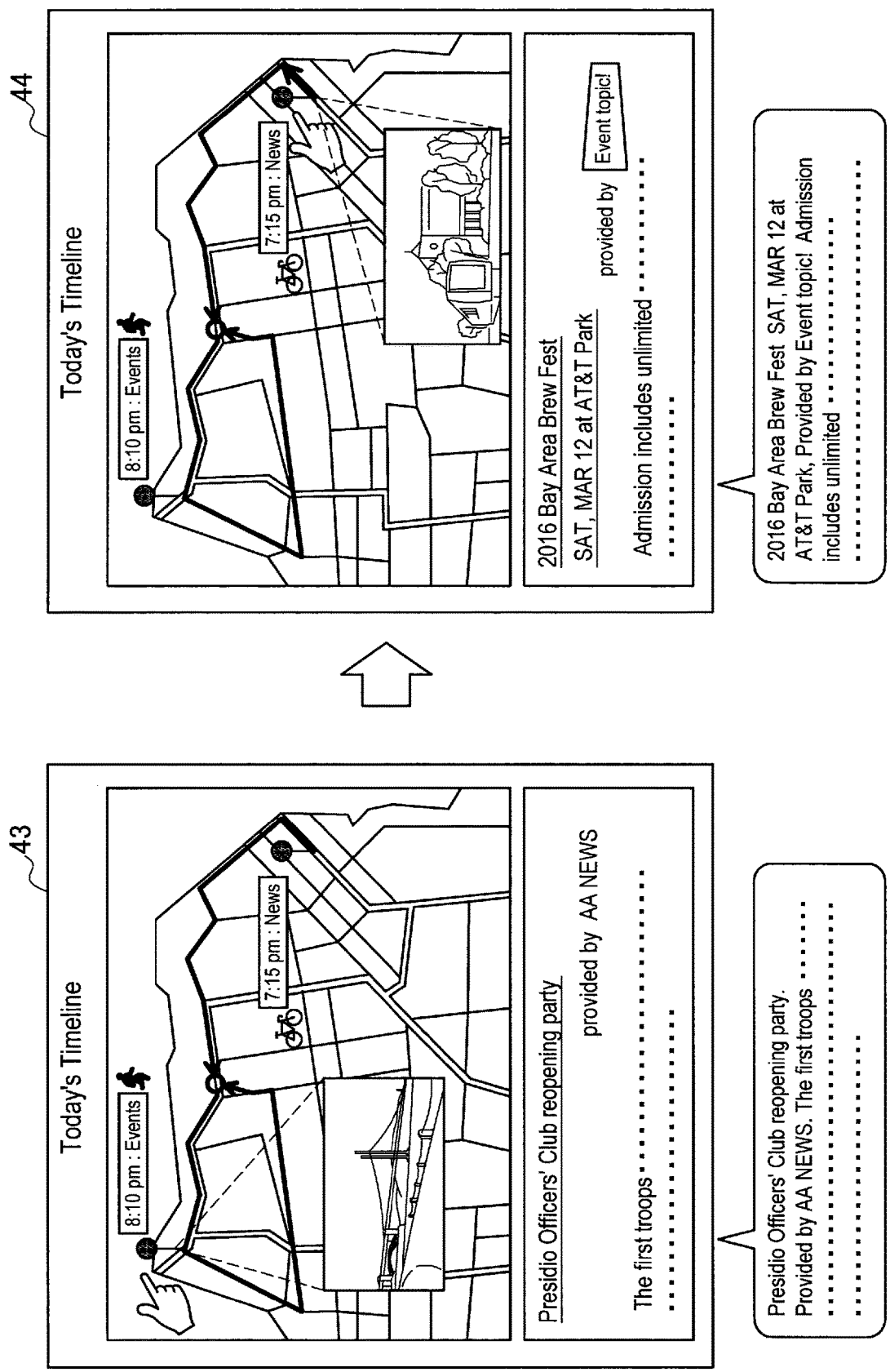
FIG. 15 is a diagram illustrating timeline UI according to a modification of the first example.

Specifically, as illustrated on a screen 43 on the left in FIG. 15, first of all, the timeline locus is illustrated on the map image, the user taps an arbitrary point, and a scenery (captured image) at the tapped point is displayed. Further, text of the information read aloud at the same point is displayed, and the information read aloud at the same point is output again as audio. Further, the text displayed here may be text of read audio information. Further, the timeline locus of a plurality of high context is displayed on the map image. Furthermore, a pin indicating a point where the information is read aloud, a type of the read-aloud information, time, and action (low context) are displayed together on a map.

Further, the user taps a point on the timeline locus, as illustrated on a screen 44 on the right in FIG. 15, and a scenery (captured image) at a tapped point is displayed on the map image. Further, text of the read-aloud information at the point is displayed, and the information read at the point is output again as audio.

As mentioned above, by outputting the read-aloud information again as audio as well as the timeline locus and a captured image (scenery) at the reading point and reproducing a situation at the reading-aloud time, it is possible to support to remind which audio information is to be specifically listened by the user.

4-2. Second Example

Subsequently, a description will be given of a screen display example according to a second example with reference to FIG. 16. According to the second example, the read-aloud audio information is displayed at the action time for each user action. In the case, by changing the display granularity of the audio information depending on the user's preference based on the user operation at the reading-aloud time, search of information of the user is supported.

Figure 16:
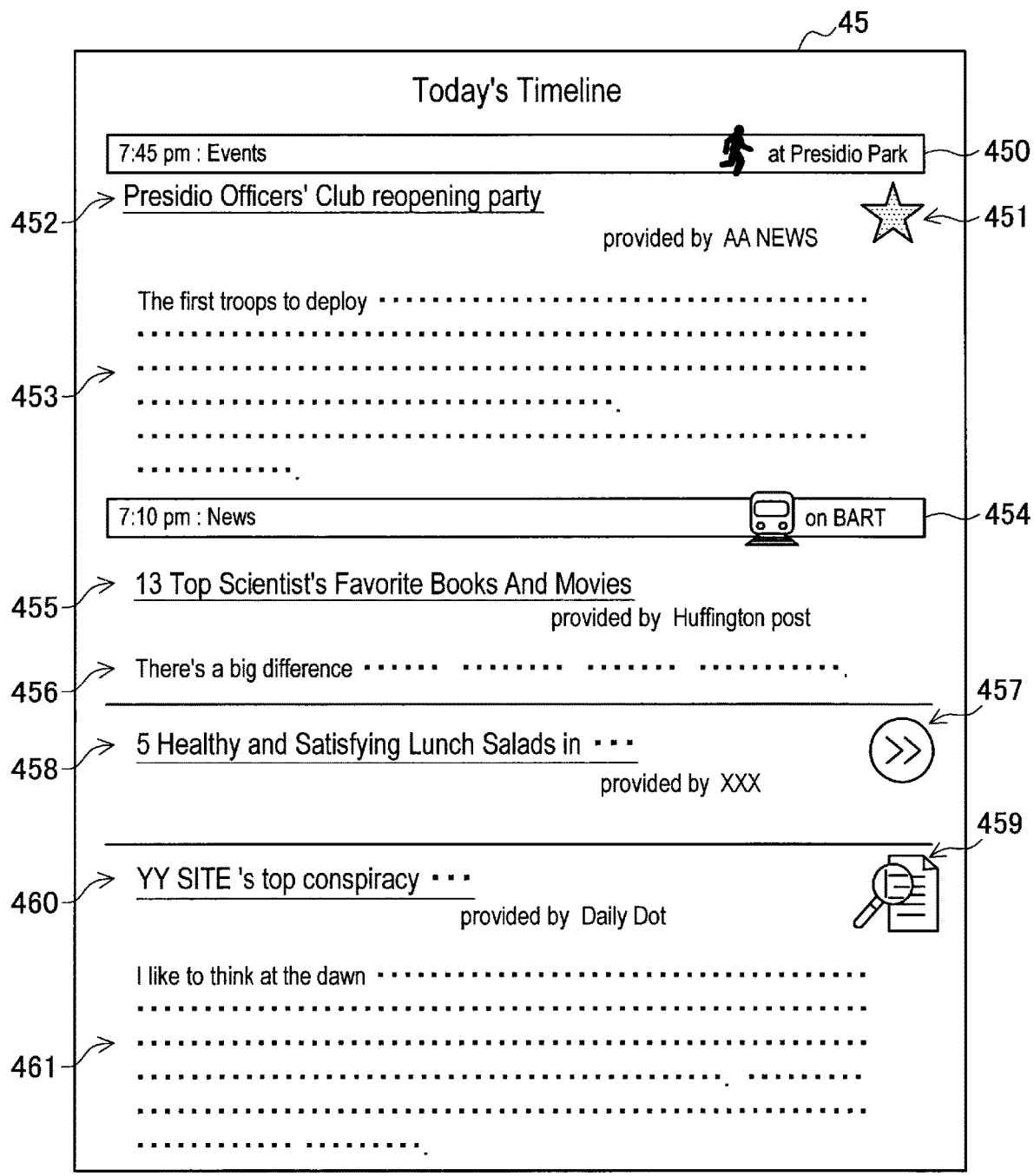
FIG. 16 is a diagram illustrating a screen display example according to a second example of the present embodiment.

For example, as illustrated in a screen 45 in FIG. 16, as "Today's Timeline", items 450 and 454 illustrating the user action (herein, low context as an example) of all day today is displayed in chronological order, and the information read aloud at the action time is displayed under the items.

Icons 451, 457, and 459 indicating the user operation at the reading are displayed alongside the reading-aloud information. For example, in a case where a voice operation for instructing "Bookmark" is spoken by the user with regard to the event information read aloud when the user runs in a park at 7:45 (speaking "Bookmark"), the timeline UI generation section 20b of the server 2 determines that positive feedback is performed. As a consequence, since the event information is interested by the user, the display is controlled with the information granularity "large". That is, a title 452 and all the body text 453 of the reading-aloud information are displayed. It is noted to presume that the title and the first sentence of the body text are read aloud at the reading-aloud time. In a case where the user listens to the title or the first sentence of the body text and is interested therein, the user speaks "Bookmark", and easy checking is set when checking the information later. Further, as illustrated in FIG. 16, a predetermined icon 451 indicating that a voice operation of "Bookmark" is displayed with the event information.

Further, for example, an icon 459 illustrates that a voice operation of "More" is performed. In this case, a Positive Feedback operation is determined, and news information is displayed with large granularity. That is, for example, as illustrated in FIG. 16, in a case where the voice operation of "More" is performed to the third news information read aloud when the user has been on a train at 7:10, a title 460 and all body text 461 are displayed.

As mentioned above, the user operation determined as the Positive Feedback operation is, for example, "More", "Again", or "Bookmark". The cases can be displayed with large granularity.

On the other hand, a voice operation of "Skip" is determined as a Negative Feedback operation. In this case, the information is displayed with "small" granularity. For example, as illustrated in FIG. 16, in a case of performing the voice operation of "Skip" to the second news information read aloud when the user has been on a train at 7:10, the timeline UI generation section 20b of the server 2 determines that negative feedback is performed, and only a title 458 is displayed. Further, a predetermined icon 457 indicating that the voice operation of "Skip" is performed is displayed together. As mentioned above, since it is assumed that the information that is not interested by the user is not a search target, the amount of display is reduced, thereby supporting the search of the information to be checked by the user.

Further, in a case where the voice operation is never performed or in a case where the voice operation is "Previous", the preference is not determined, and the display is controlled with "middle" granularity. For example, as illustrated in FIG. 16, in a case where any operations are not performed to the first news information read aloud when the user has been on a train at 7:10, a title 455 and a first sentence 456 of the body text are displayed.

4-3. Third Example

Subsequently, a description will be given of a screen display example according to a third example with reference to FIG. 17. According to the above-mentioned second example, the granularity of the information display is changed depending on the user preference based on the user operation for reading aloud the information. The embodiment is not limited to this, and the granularity of the information display may be changed depending on the user load based on the user action, for example, at the time for reading aloud the information. In the third example, a description will be given of granularity change of the information display depending on the user load.

As illustrated in FIG. 17, items 461, 462, 463, and 464 indicating user actions (herein, low context as an example) of all day today are displayed in chronological order as "Today's Timeline" on a screen 46, and texts of pieces of the audio information read aloud when the actions have been taken are displayed under the respective items.

The user load corresponding to the user action indicates a degree of a situation (it is hard to concentrate on the audio information) in which it is hard for the user to listen to the audio information as mentioned above and, for example, it is determined that the user load is high (that is, it is hard to listen to the audio information) during running or cycling. Therefore, as illustrated in FIG. 17, for example, there is high possibility that the user has missed listening to the event information read when the user has been running at 7:45 (item 461). Therefore, the display is controlled with the information granularity "large". Specifically, for example, the title and all the body text are displayed. As a consequence, in a case where the information is read aloud but is hardly listened while running, the convenience is improved when checking the reading-aloud information later (it is noted to premise that the read-aloud information (the voice operation of "More" is not performed) includes the title and the first sentence of the body text according to the present embodiment).

Further, it is determined that the user load is not higher during the walking than that of the running or cycling, and the display of the read-aloud information is controlled with the information granularity "middle". For example, as illustrated in FIG. 17, the news information read aloud when the user has been walking at 7:10 (item 462), there is high possibility to listen to some degree. The display is controlled with the information granularity "middle". Specifically, for example, the title and the first sentence are displayed.

Further, it is determined that the user load is lower at the time of being on a train than that during the walking, and the display of the reading-aloud information is controlled with the information granularity "small". For example, as illustrated in FIG. 17, the possibility is high to firmly listen to the news information read aloud when the user has been on a train at 7:12 (item 463). Therefore, the display is controlled with the information granularity "small". Specifically, for example, only the title is displayed. Since the read-aloud information is certainly listened when being on a train, the possibility for re-checking later is low. By reducing the amount of display of the audio information, it is possible to prevent the disturbance when the user checks another reading-aloud information.

4-4. Fourth Example

Subsequently, a description will be given of a screen display example according to a fourth example with reference to FIG. 18. The description has been given of the case of changing the display of the information granularity in the timeline depending on a preference determining result based on the user operation at time for reading aloud information or the user load based on the user action at time for reading the information according to the above-mentioned second and third examples. However, the embodiment is not limited to this, for example, the font size of display information may be further changed depending on the preference determining result or the user load.

As illustrated in FIG. 18, items 471 and 474 indicating the user action (herein, low context as an example) of all day today are displayed on a screen 47 as "Today's Timeline" in chronological order, and texts of pieces of the audio information read aloud when the actions have been taken are displayed under the respective items.

For example, as illustrated in FIG. 18, when the user runs in a park at 7:45 (item 471) (speaking "Bookmark") and performs the voice operation for instructing "Bookmark" to the read-aloud event information, the timeline UT generation section 206 of the server 2 determines that positive feedback is performed. As a consequence, since the event information is interested by the user, the display is controlled with the information granularity "large", further, the display is performed with font size "large". That is, the title and all the body text of the reading-aloud information are displayed with font size larger than that of the audio information that is negative fed-back, which will be described later, and the audio information whose preference is not determined. Further, a predetermined icon 472 indicating that a voice operation of "Bookmark" has been performed is displayed together. As a consequence, the convenience is improved when checking the audio information in which the user has interest later Further, in a case of performing the voice operation for instructing "More" to the news information read aloud when the user has been on a train at 7:10 (item 474), similarly, it is determined that the positive feedback is performed, and the title and all the body text of the reading-aloud information are displayed with font size "large". Further, a predetermined icon 475 indicating that the voice operation of "More" is performed is displayed together. As a consequence, the convenience is improved when checking the audio information in which the user has interest later.

Further, as illustrated in FIG. 18, no operation is performed regarding the second event information read aloud when the user has been running in the park at 7:45 (item 471). Regarding the third event information, in a case of performing a voice operation for instructing "Skip" (icon 473 means the "Skip" operation is performed), any display is controlled with font size "small". As mentioned above, the audio information in which the user does not have interest is displayed with small size, and it is possible to prevent the disturbance when the user searches for the information by scrolling the timeline UI.

It is noted that, in the example illustrated in FIG. 18, the description is given of changing the font size depending on the user's preference as an example. The embodiment is not limited to this and the font size may be changed depending on the user load based on the user action. In this case, for example, in a case where the user load is high, the display is performed with large font size and, in a case where the user load is low, the display is performed with small font size.

4-5. Fifth Example

Subsequently, a description will be given of a screen display example according to a fifth example with reference to FIG. 19. According to the present embodiment, in a case where the reading-aloud information is interrupted and restarted depending on context of the user action, on the timeline UI, a display together with information about the interrupt and restart enables the user to easily remind of a situation arisen when the user has been listening to the reading-aloud information and support the search of the information.

As illustrated in FIG. 19, items 481, 483, and 486 indicating the user action (herein, low context as an example) of all day today are displayed in chronological order as "Today's Timeline" on a screen 48, and texts of pieces of the audio information read aloud when the actions have been taken are displayed under the respective items. Herein, in a case where the read-aloud audio information is displayed and the reading-aloud is interrupted depending on context of the user action, "paused" (display 482 and display 485) is displayed. In a case of restarting, "continue" (display 484, display 487) is displayed. For example, it is possible for the reading-aloud control section 10b of the information processing apparatus 1 to perform control such that information is read aloud in a case where the user stops by signal waiting or the like in consideration of the user load (easy-to-listen) based on the user action, and it is also possible for the reading-aloud control section 10b of the information processing apparatus 1 to perform control such that the reading is interrupted when the user starts to move, and the reading is restarted when the user stops again. The above-mentioned reading-aloud control information ("interrupt" and "restart") is included in the reading-aloud history, and is sent to the server 2.

Further, at the timeline UI when checking the audio information later, as illustrated on the screen 48 in FIG. 19, text of the read-aloud audio information is displayed together with reading control information such as "interrupt" and "restart". As a consequence, it is possible for the user to intuitively grasp that the read-aloud news information is interrupted in the middle when the user stops by, for example, signal waiting or the like while riding a bicycle at 7:10 (item 481) and the subsequent information is read aloud when the user rides a bicycle at 7:15 and stops again by signal waiting (item 483).

4-6. Others

The above description has been given of the timeline UI according to the present embodiment with a plurality of examples. It is noted that the timeline UI according to the present embodiment is not limited to the above-mentioned, and may be further the following.

(Timeline UI Configured Based on Scenery)

Figure 20:
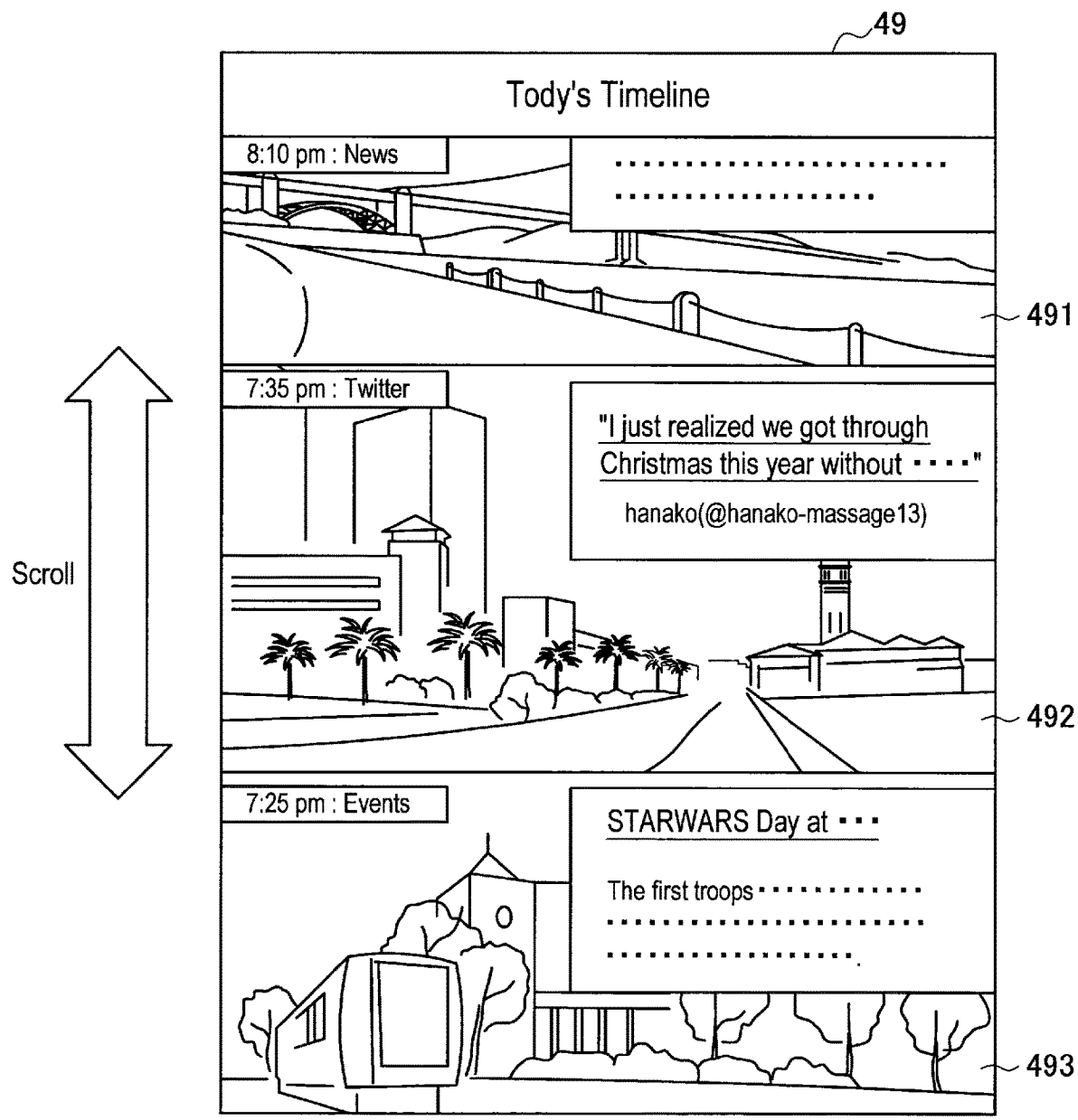
FIG. 20 is a diagram illustrating another timeline UI according to the present embodiment.

FIG. 20 is a diagram illustrating another timeline UI according to the present embodiment. As illustrated in FIG. 20, captured images 491, 492, and 493 (e.g., captured boundary image captured at the time of reading the information by the camera 13 of the information processing apparatus 1, or prepared captured images at points) that reflect sceneries at points for reading aloud the information today are displayed in chronological order as "Today's Timeline" on a screen 49. Since a memory about the existing place where the audio information is presented is easily remained, it is possible to easily search for target information with a scenery that is seen by the user, e.g., the screen 49 in FIG. 20 when the user checks missing information or the like later. Further, text and time of the audio information read aloud at the place (read-aloud information), the type of the information, and the like may be displayed on a captured image display on the screen 49.

(Synchronization Between Timeline Locus and Reading-Aloud Information Display Area)

FIG. 21 is a diagram illustrating another timeline UI according to the present embodiment. As illustrated on the left in FIG. 21, a timeline locus (locus of a moving path) of the user action is displayed as "Today's Timeline" in a map image 501 on a screen 50. The user taps an arbitrary point on the timeline locus, and text (or image) of information read aloud at the point is displayed in a reading display region. On the screen 50, weather report information (item 502) read aloud, for example, at the tapped point is displayed in a reading display region (down in a map image 501 in an example illustrated in FIG. 21).

Subsequently, the user performs an operation for tracing the timeline locus, and an item of the reading-aloud information displayed in the reading-aloud display region synchronously with the operation is scrolled, and content of a corresponding item is displayed. For example, as on a screen 51 illustrated on the right in FIG. 21, a screen in the read-aloud information display region is scrolled with the user operation for tracing the timeline locus, and content (event information) of a next item 503 is displayed. Herein, for example, text of the read audio information is displayed. Further, the scenery of a corresponding point is displayed in the map image 511.

It is noted that the map image 511 can be changed in scale with pinch-in-out, and the read-aloud information display region is also synchronized.

(Emphasizing Display of Keyword)

FIG. 22 is a diagram illustrating another timeline UI according to the present embodiment. As illustrated in FIG. 22, items 521 and 522 indicating the user action (herein, low context as an example) of all day today are displayed in chronological order as "Today's Timeline" on a screen 52. Text of the read-aloud audio information at the action time is displayed under the items.

In the example illustrated in FIG. 22, text displayed on the screen 52 is actually the read-aloud audio information (read-aloud information), and a predetermined keyword of the read-aloud information is further emphasized and displayed (for example, displayed with large font size) As the predetermined keyword, it is assumed that words such as a proper noun or noun used in the title can be easily remained in a memory of the user who listens to the reading-aloud information.

As mentioned above, by presenting the timeline UI for emphasizing and displaying a keyword of the read-aloud information, the information is easily searched with a keyword as a clue when the user searches for the information.

5. CONCLUSION

As mentioned above, with the information processing apparatus 1 according to the embodiment of the present disclosure, it is possible to improve the convenience when checking the read-aloud audio information. Specifically, by presenting UI for enabling the search based on the date and time, position, action, operation or scenery at the time for reading aloud the information, it is possible to easily search for information to which the user misses listening or in which the user has interest later.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, a ROM, and a RAM built in the above-described information processing apparatus 1 to perform the functions of the information processing apparatus 1. In addition, there is also provided a computer-readable storage medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an output control section that outputs information about a display screen for displaying text of audio information in chronological order with information granularity determined on the basis of a user operation at the time of reading aloud the audio information included in an acquired reading-aloud history of the audio information.

(2)

The information processing apparatus according to (1), in which the information granularity is an amount of information, and is controlled as any of only a title, a set of the title and a part of body text, and a set of the title and all of the body text.

(3)

The information processing apparatus according to (2), in which the user operation is an audio input operation indicating a skip instruction, a repetition instruction, a specific reproduction instruction, a bookmark instruction, or a return instruction.

(4)

The information processing apparatus according to any one of (1) to (3), in which the output control section further outputs information about a display screen in which a font size of the audio information is changed depending on user preference estimated on the basis of the user operation.

(5)
The information processing apparatus according to any one of (1) to (4),
in which the information granularity of the audio information is controlled depending on user load estimated on the basis of user action at the time of reading aloud the audio information included in the reading-aloud history.

(6)
The information processing apparatus according to any one of (1) to (5),
in which the display screen further includes at least one of a recognition result of user action at the time of reading aloud the audio information included in the reading-aloud history, date and time and place at reading-aloud time, and a type of information that has been read aloud.

(7)
The information processing apparatus according to any one of (1) to (6),
in which, regarding reading-aloud information displayed on the display screen, text of a part that is not read aloud is emphasized and displayed rather than text of information that has been read aloud.

(8)
The information processing apparatus according to any one of (1) to (7),
in which a moving locus based on a position history of the user at the time of reading-aloud each piece of audio information included in the reading-aloud history is displayed on a map image included in the display screen, and audio information that has been read aloud near an arbitrary point of the moving locus designated by the user is further displayed.

(9)
The information processing apparatus according to (8),
in which a captured image of scenery near the arbitrary point of the moving locus designated by the user is further displayed on the display screen.

(10)
An information processing method including:
outputting, by a processor, information about a display screen for displaying text of audio information in chronological order with information granularity determined on the basis of a user operation at the time of reading aloud the audio information included in an acquired reading-aloud history of the audio information.

(11)
A program causing a computer to function as:
an output control section that outputs information about a display screen for displaying text of audio information in chronological order with information granularity determined on the basis of a user operation at the time of reading aloud the audio information included in an acquired reading-aloud history of the audio information.

REFERENCE SIGNS LIST 1 information processing apparatus
10 control section
10a reading-aloud information acquisition section
10b reading-aloud control section
10c user situation recognition section
10d operation recognition section
10e reading-aloud history sending control section
11 communication section
12 microphone
13 camera
14 9-axis sensor
15 speaker
16 position measurement section
17 storage section
2 server
20 control section
20a storage control section
20b timeline UI generation section
20c sending control section 20c
21 communication section
22 storage section
3 display device
4 network

The invention claimed is:
1. An information processing apparatus comprising:
circuitry configured to
acquire reading-aloud history of audio information, the reading-aloud history including a user operation of a user at a time of reading aloud audio information included in reading aloud information,
determine, based on the user operation at the time of reading aloud the audio information, information granularity of display information of text of the audio information,
generate, based on the determined information granularity, an amount of information of the text of the audio information for displaying on a display screen in chronological order, and
output the generated amount of information,
wherein, when the user operation at the time of reading aloud the audio information indicates a skip instruction, the circuitry determines the information granularity of the display information of text of the audio information to be a first level,
wherein, when the user operation at the time of reading aloud the audio information indicates a repetition instruction or a bookmark instruction, the circuitry determines the information granularity of the display information of text of the audio information to be a second level larger than the first level, and
wherein, when the user operation is an audio input operation indicating a return instruction, the circuitry determines the information granularity of the display information of text of the audio information to be a third level between the second level and the first level.

2. The information processing apparatus according to claim 1,
wherein the information granularity is controlled as any of only a title, a set of the title and only a part of body text, and a set of the title and all of the body text.

3. The information processing apparatus according to claim 1,
wherein the circuitry is further configured to output information about a display screen in which a font size of the audio information is changed depending on user preference estimated on a basis of the user operation.

4. The information processing apparatus according to claim 1,
wherein the information granularity of the audio information is controlled depending on user load estimated on a basis of user action at the time of reading aloud the audio information included in the reading-aloud history.

5. The information processing apparatus according to claim 1,
wherein the display screen further includes at least one of a recognition result of user action at the time of reading aloud the audio information included in the reading-aloud history, date and time and place at reading-aloud time, and a type of information that has been read aloud.

6. The information processing apparatus according to claim 1,
wherein the generated amount of information includes text of a part of the reading aloud information that is not read aloud and is emphasized and displayed and text of information that has been read aloud and is displayed and not emphasized.

7. The information processing apparatus according to claim 1,
wherein a moving locus based on a position history of the user at the time of reading aloud the audio information included in the reading-aloud history is displayed on a map image included in the display screen, and audio information that has been read aloud near an arbitrary point of the moving locus designated by the user is further displayed.

8. The information processing apparatus according to claim 7,
wherein a captured image of scenery near the arbitrary point of the moving locus designated by the user is further displayed on the display screen.

9. An information processing method comprising:
acquiring, by a processor, reading-aloud history of audio information, the reading-aloud history including a user operation of a user at a time of reading aloud audio information included in reading aloud information;
determining, by the processor and based on the user operation at the time of reading aloud the audio information, information granularity of display information of text of the audio information;
generating, by the processor and based on the determined information granularity, an amount of information of the text of the audio information for displaying on a display screen in chronological order; and
outputting, by the processor, the generated amount of information,
wherein the determining of the information granularity includes
determining, when the user operation at the time of reading aloud the audio information indicates a skip instruction, the information granularity of the display information of text of the audio information to be a first level,
determining, when the user operation at the time of reading aloud the audio information indicates a repetition instruction or a bookmark instruction, the information granularity of the display information of text of the audio information to be a second level larger than the first level, and
determining, when the user operation is an audio input operation indicating a return instruction, information granularity of the display information of text of the audio information to be a third level between the second level and the first level.

10. A non-transitory computer-readable medium having embodied thereon a program, which when executed by a computer causes the computer to execute a method, the method comprising:
acquiring reading-aloud history of audio information, the reading-aloud history including a user operation of a user at a time of reading aloud audio information included in reading aloud information;
determining, based on the user operation at the time of reading aloud the audio information, information granularity of display information of text of the audio information;
generating, based on the determined information granularity, an amount of information of the text of the audio information for displaying on a display screen in chronological order; and
outputting the generated amount of information,
wherein the determining of the information granularity includes
determining, when the user operation at the time of reading aloud the audio information indicates a skip instruction, the information granularity of the display information of text of the audio information to be a first level,
determining, when the user operation at the time of reading aloud the audio information indicates a repetition instruction or a bookmark instruction, the information granularity of the display information of text of the audio information to be a second level larger than the first level, and
determining, when the user operation is an audio input operation indicating a return instruction, information granularity of the display information of text of the audio information to be a third level between the second level and the first level.

* * * * *